(12) United States Patent
Repperger et al.

(10) Patent No.: US 7,912,283 B1
(45) Date of Patent: Mar. 22, 2011

(54) IMAGE ENHANCEMENT USING OBJECT PROFILING

(75) Inventors: Daniel W. Repperger, Dayton, OH (US); Alan R. Pinkus, Bellbrook, OH (US); Rodney G. Roberts, Tallahassee, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 769 days.

(21) Appl. No.: 11/998,986

(22) Filed: Oct. 31, 2007

(51) Int. Cl.
*G06K 9/00* (2006.01)
(52) U.S. Cl. ......... 382/168; 382/170; 382/252; 382/262
(58) Field of Classification Search .................. 382/168, 382/170, 141, 254, 262; 700/8, 17; 712/32; 348/143, 222.1; 345/419, 424; 375/240.27, 375/240.29
See application file for complete search history.

(56) References Cited

U.S. PATENT DOCUMENTS

| | | | |
|---|---|---|---|
| 5,487,172 A * | 1/1996 | Hyatt | 712/32 |
| 6,486,909 B1 * | 11/2002 | Pirim | 348/143 |
| 7,190,725 B2 * | 3/2007 | Pirim | 375/240.27 |
| 7,307,655 B1 * | 12/2007 | Okamoto et al. | 348/222.1 |
| 7,774,075 B2 * | 8/2010 | Lin | 700/17 |

* cited by examiner

*Primary Examiner* — Anh Hong Do
(74) *Attorney, Agent, or Firm* — AFMCLO/JAZ; Daniel J. Krieger

(57) ABSTRACT

The identification of a specific object in a visual image compromised by the addition of noise, too little or too much light, cluttered with other objects that confuse the user, or having other image defects and using novel techniques that make the image appear more salient to a human operator. Novel techniques include representing both the object to be identified and an appropriate sample of the given data image that has been selected as matrices and comparing the two.

20 Claims, 30 Drawing Sheets

$A_k$ = Object Image — 500

50% of full size

30% of full size

20% of full size

10% of full size

5% of full size

IMAGE ENHANCEMENT USING OBJECT PROFILING

RIGHTS OF THE GOVERNMENT

The invention described herein may be manufactured and used by or for the Government of the United States for all governmental purposes without the payment of any royalty.

BACKGROUND OF THE INVENTION

The field of the invention is image enhancement and more particularly image enhancement based on object profiling and histogram signature.

FIG. 1 illustrates a prior art binocular type digital imaging system and displays the problem of interest. The object to be identified 100 may appear anywhere in the picture. This object may have various sizes (in the image) depending on its distance from the camera 101 or other information gathering device which provides the source of the visual rendering. Also, the object may be rotated, so its orientation may change. Both the lightness level and the contrast of the object to be discerned may also be compromised 102 yet the operator has to make a quick decision on the identity of the entity in question.

FIG. 2 illustrates an example of a prior art head mounted digital imaging system. In FIG. 2, the operator is wearing a helmet-mounted display or eye-glass system 200. This display may be a night vision goggle device to amplify light or other apparatus to enable the user to discern better quality information from the environment yet still be able to move around. In FIG. 2, the aircraft 202, or other object to be examined, impacts the visual display at the multi-spectral sensors at 201. These data are then transferred to the central processing unit (CPU) 202, which may consist of a chip or other microprocessor element. Also, at the central processor, is a signal received from the output of the adjustment knob 204. After the identification of the object is made more salient, the final output signal to the HMD (head mounted display) is transferred from the CPU to the HMD 205. The signal is further transferred to the optical glass at 206 as indicated in FIG. 2. The operator sees the modified image at the optical glass. There may exist a latency in producing the enhanced image at 206 because of the computation time and cycle time to process the requisite information (going from points 201-206).

Prior Art image recognition methods may employ a difference matrix D. In order to find an object $A_k$ when it is embedded in a large picture, you must take a sample matrix $A_m$. In other words, the goal will be to find a submatrix $A_k$ (the same size of $A_m$) when it may appear anywhere in the larger matrix A, which is searched. A difference matrix $D=A_m-A_k$ is computed between the sample and the object. If the difference matrix is essentially filled with zero elements, then the test image $A_k$ has been "found" in the larger image at the spatial location of the coordinates of $A_m$ and the object has been identified.

Some problems that often occur with prior art image recognition include:

The computational burden of computing all the pixels that must be used in $A_m$ and $A_k$;

Noise may enter the image and bias the results. The present invention will address noise in images;

The size of the object may be different from that initially planned. The training image $A_k$ may be of the incorrect size due to inaccurate assumptions of camera distance;

The sensitivity of detecting when $\|D\|^2$ is near zero is inadequate in prior art systems; and The sample object $A_m$ in the data image may be rotated and appear significantly different from the initially trained image $A_k$. Consequently, there will not be a perfect match due to an orientation change of the sampled object. In United States Air Force applications, many pictures are taken from the air and the object to be examined may have an arbitrary rotation, which cannot be known apriori. The present invention employs an image identification algorithm sufficiently robust that does not depend on the orientation of the object nor on the relative size of the object.

Such prior art deficiencies with respect to rotation are illustrated in FIG. 5. FIG. 5 portrays an aircraft object ($A_k$) 500 we wish to, identify in a larger image. For simplicity, it will be assumed that the sizes (number of rows, columns and pixels of the sample matrix $A_m$ and object matrix $A_k$) are known and fixed. FIG. 6 shows the first data test image ($A_1$) constructed to examine the efficacy of the present methods to identify the object $A_k$. Please note in FIG. 6, the three sites of the test objects, 602-604, have the identical orientation as the trained object $A_k$ 500 in FIG. 5. FIGS. 7a and 7b show the plots of the $L_2$ norm ($\sigma_1$) for the top 600 and bottom 601 rows of FIG. 6. In FIGS. 7a and 7b, the x-axis, 701 and 703, respectively, is the spatial location in the image, and the y-axis, 700 and 702 is $L_2$ norm ($\sigma_1$). Since sudden downward changes of $\sigma_1$ are an indication of the object in the picture, clearly this norm has efficacy of identifying the spatial location of objects because of the sudden and sharp dips of the $L_2$ norm at the spatial location where the object appeared. In FIG. 7a the dip representing the location where the object appeared is at 705 for the top row of FIG. 6 and in the 7b plot 704 represents the location where the airplanes appear in the bottom row of FIG. 6.

In FIGS. 8a and 8b, the same results are shown with the Frobenius norm. The Frobenius norm refers to the sums of the squares of all the elements of a matrix. For a difference matrix (which has most terms near zero), the sums of the squares of all the elements is a small positive number. In FIGS. 8a and 8b the x-axis at 801 and 804 respectively is the spatial location in the image. The image has 700 columns from left to right and the x-axis is the bin or column number and the y-axis at 800 and 803 represents Frobenius norm. Each bin number is 1/700 the distance from the left to the right side of the image. Again the spatial location of the object can be identified because the Frobenius norm suddenly drops to a low value at the true location of the object, at 802 in FIG. 8a and at 805 in FIG. 8b. It is significant that the results in FIGS. 7 and 8 look impressive because the trained object was not rotated from the original test image supplied in FIG. 5.

To further illustrate the deficiencies in the prior art with rotation, the test object is now rotated and inserted into a second test image $A_2$ as shown in FIG. 9. The goal is to correctly detect the spatial position in the image $A_2$ where the object may appear. FIG. 10 displays the plot of the $L_2$ norm and FIG. 11 shows the corresponding plot of the Frobenius norm for the test image $A_2$. This prior art method has failed to correctly identify the spatial location of the object. FIGS. 10a, 10b and 11a and 11b don't have a distinct sudden drop or dip to indicate location of an object as do FIGS. 7a, 7b, 8a and 8b. It is clear now that because the trained image did not contain rotational information about the object in its initialization, prior art methods are ineffective in identifying objects in a test image. They break down when the object appears in the data image but has been rotated. This present invention provides means for identifying an object in a visual image having size and rotation variations and other viewing issues in the prior art.

SUMMARY OF THE INVENTION

The identification of a specific object in a visual image when such image is compromised by the addition of noise, too little or too much light, cluttered with other objects that confuse the user, various rotation and sizes, or having other image defects. The present invention uses novel techniques that make the image appear more salient to a human operator by representing both the object to be identified and an appropriate sample of the given data image that has been selected as matrices and a histogram signature and comparing the two.

Accordingly, it is a primary object of the present invention to provide a method and device for identification of a specific object in a compromised visual image. Another object of the present invention is to provide a method and device for identification of a specific object in a visual image compromised by the addition of noise, too little or too much light and various rotations and sizes.

Another object of the present invention is to provide a method and device for identification of a specific object in a compromised visual image by representing both the object to be identified and an appropriate sample of the given data image that has been selected as matrices and a histogram signature and comparing the two.

It is still another object of the invention to provide a method and device for identification of a specific object in a compromised visual image by representing both the object to be identified and an appropriate sample of the given data image that has been selected as matrices and a histogram signature, based on the matrixes having similar histograms irrelevant of rotation and size, and comparing the two.

These and other object of the invention are achieved through the description, claims and accompanying drawings and a method for identifying an object in a compromised visual image comprising the steps of:

providing a visual display containing multispectral sensors;

obtaining a plurality of visual images of various rotations containing an object of interest using said multi-spectral sensors;

representing each of said plurality of visual images of various rotations in matrix format;

transferring said plurality of visual images in matrix format to a central processing unit;

determining image histograms for said plurality of visual images of various formats;

summarizing said image histograms from said determining step into a single, average image histogram;

generating a same-sized training histogram for each of said plurality of visual images in matrix format; and computing a difference matrix between said single, average histogram and said same-sized training histogram;

wherein said steps are repeated until said difference matrix is below a predetermined threshold value.

The foregoing and other features and advantages of the present invention will become more apparent in light of the following detailed description of the preferred embodiments thereof. While the invention will be described in connection with one or more preferred embodiments, it will be understood that it is not intended to limit the invention to those embodiments. On the contrary, it is intended that the invention cover all alternatives, modifications and equivalents as may be included within its spirit and scope as defined by the appended claims.

DETAILED DESCRIPTION OF THE INVENTION

Figure 3:
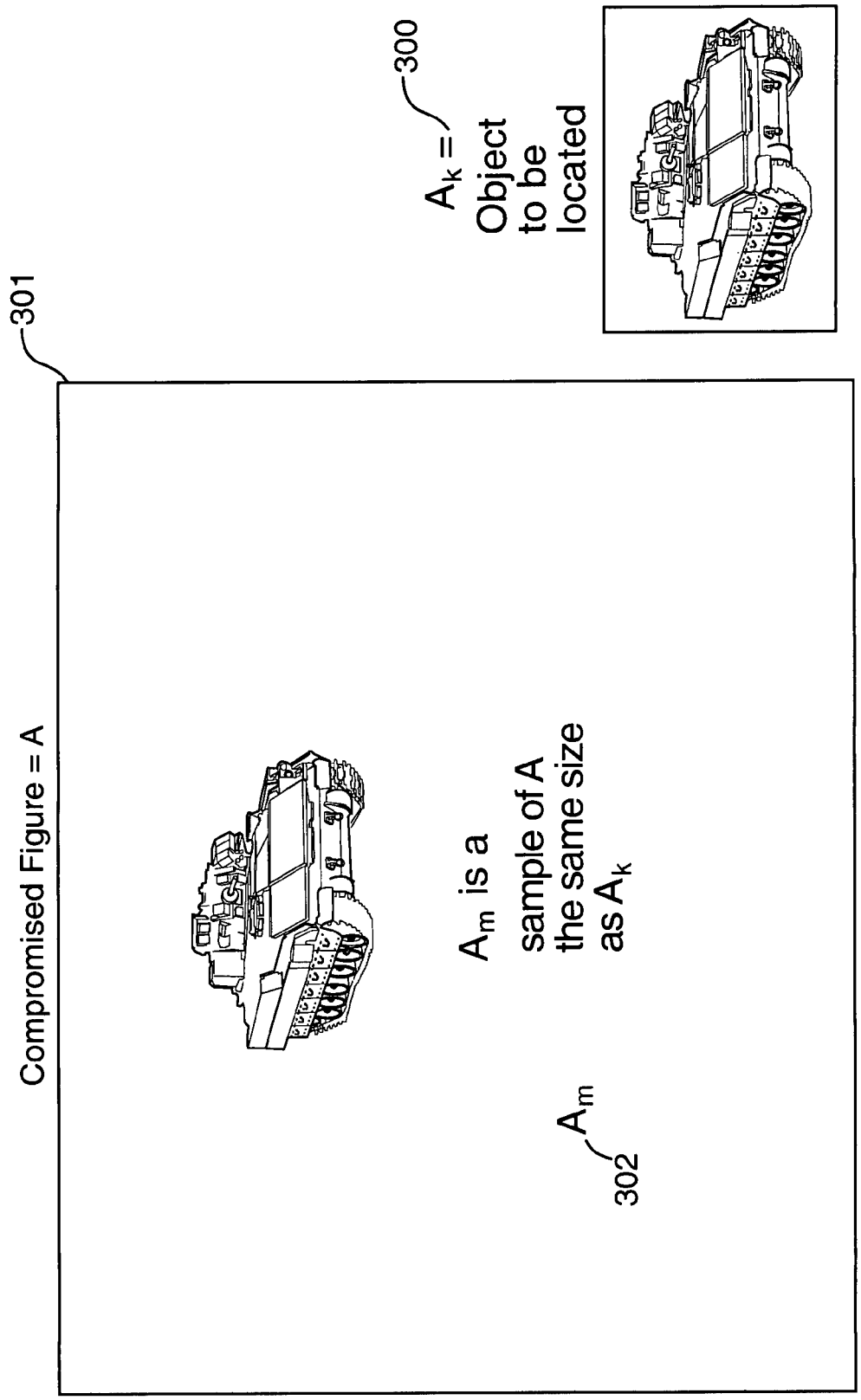
FIG. 3 shows a visually compromised object according to the invention.

The key problem of interest, illustrated in FIG. 3, is to find an object $A_k$ 300 when it may be embedded in a large picture 301. We take a sample matrix $A_m$ 302 inside A 301. It is necessary to characterize every image (the object $A_k$ 300, the sample $A_m$ 302, and the large image A 301) in terms of their matrix representations. In other words, the goal will be to find a submatrix $A_k$ (the same size of $A_m$) when it may appear anywhere in the larger matrix A, which is searched. We then compute a difference matrix $D=A_m-A_k$ between the sample and the object. If the difference matrix is essentially filled with zero elements, then the test image $A_k$ has been "found" in the larger image at the spatial location of the coordinates of $A_m$ and the object has been identified.

Figure 4:
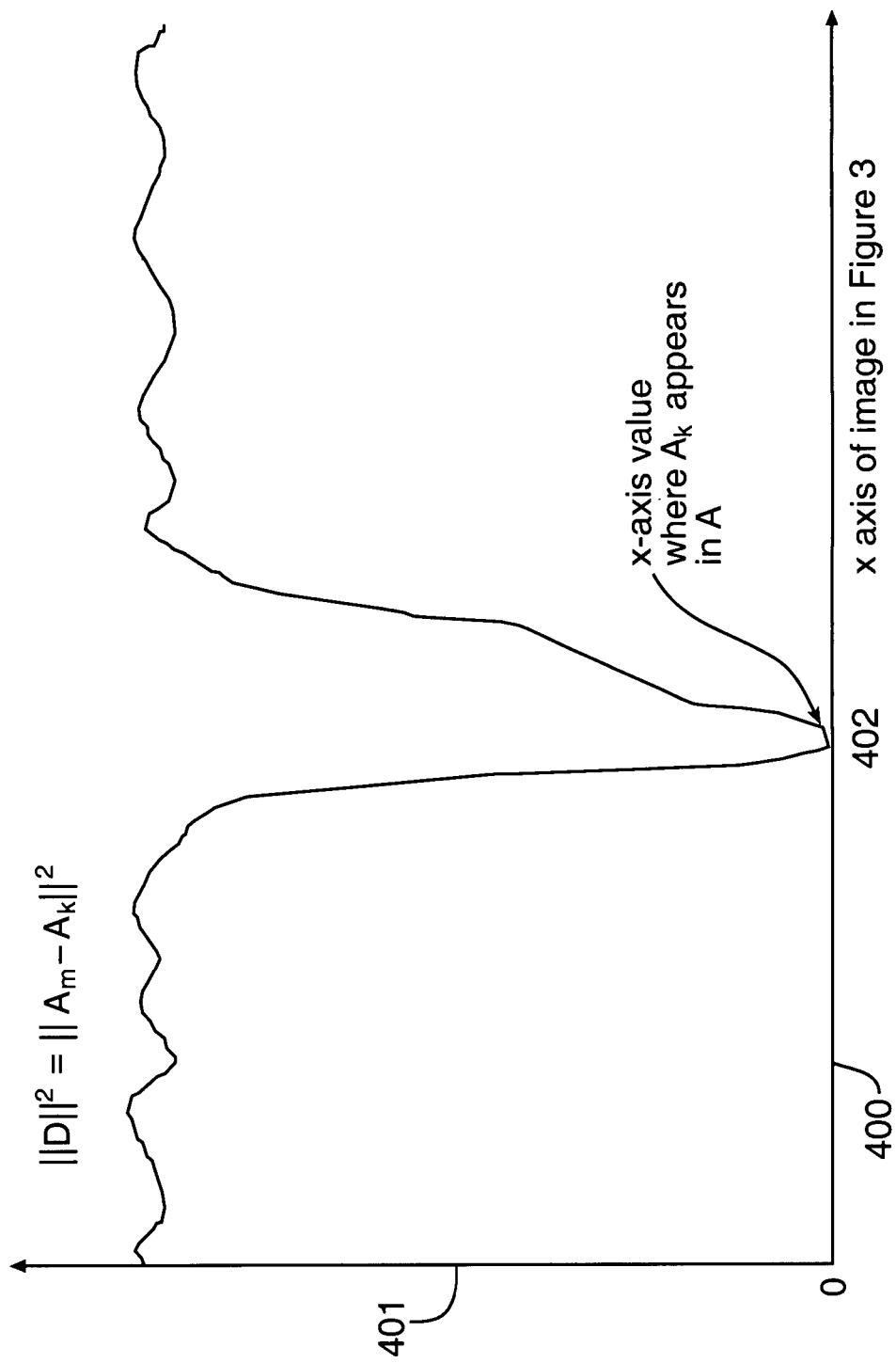
FIG. 4 shows a plot of the norm squared versus an image axis.
Figure 5:
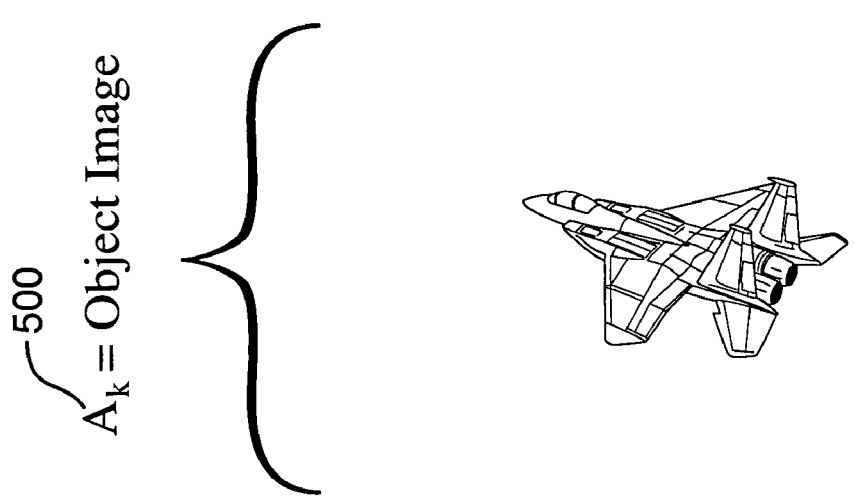
FIG. 5 shows an object to be identified according to the invention.
Figure 6:
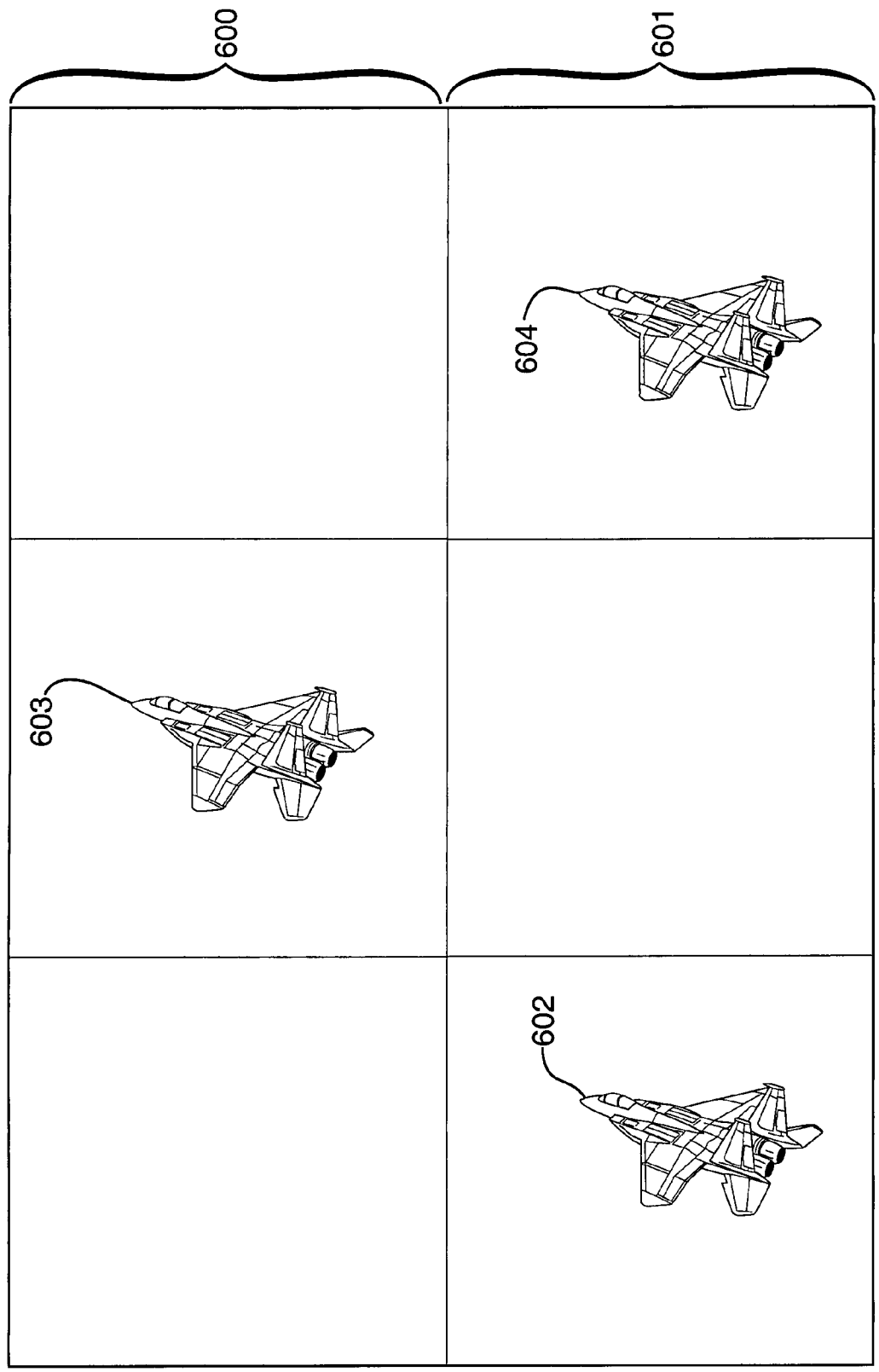
FIG. 6 shows a test image according to the invention.
Figures 7A, 7B:
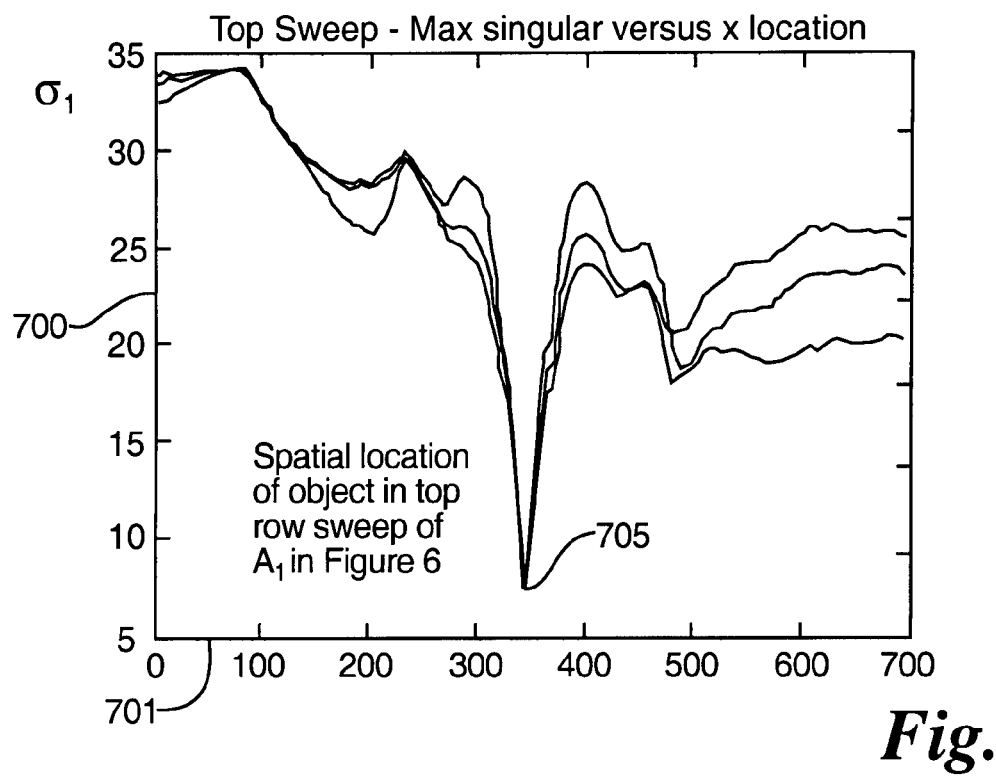
FIG. 7a shows a prior art graph of spatial location of object in top row sweep.
FIG. 7b shows a prior art graph of spatial location of object in bottom row sweep.
Figure 8A:
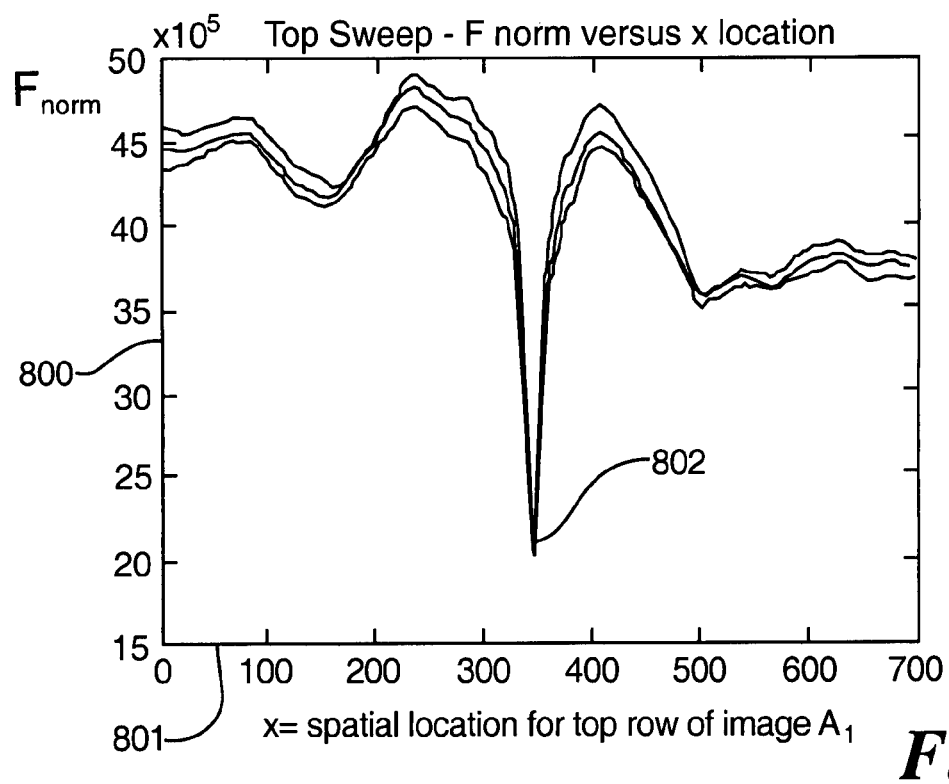
FIG. 8a shows a prior art graph of spatial location of object in top row sweep.
Figure 8B:
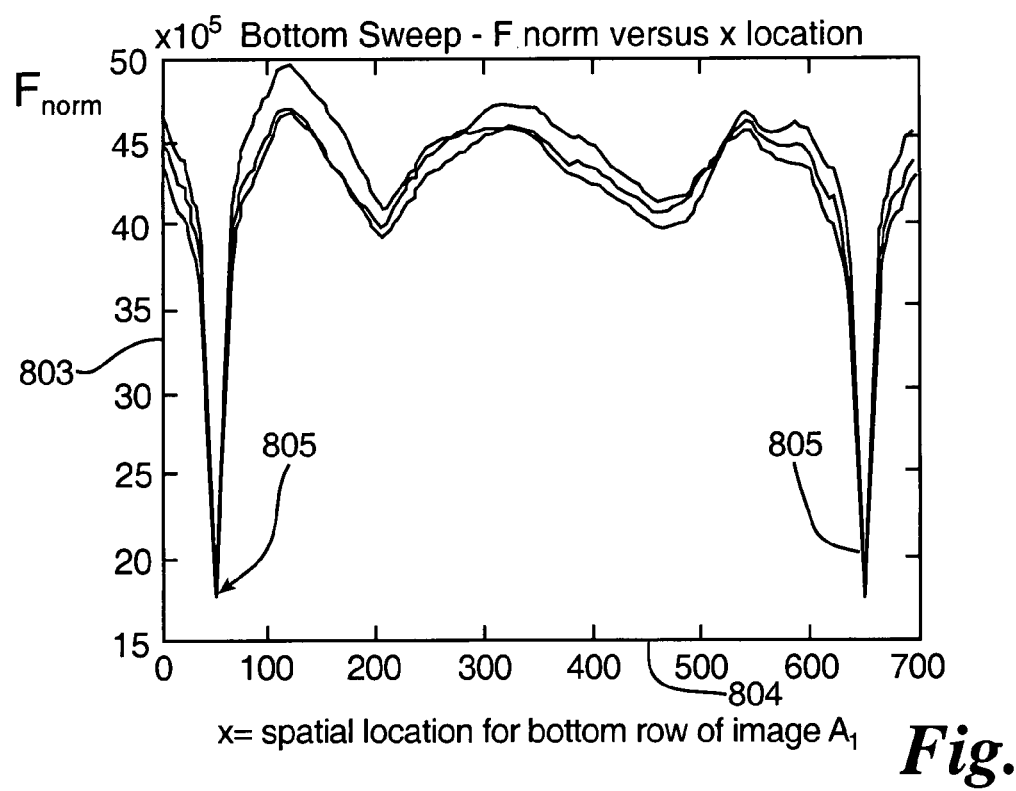
FIG. 8b shows a prior art graph of spatial location of object in bottom row sweep.

FIG. 4 is a proposed view of how the location of the object would appear in one axis of the picture if the object were perfectly identified at a point in the image. FIG. 4 shows a plot of the norm squared versus an image axis. In FIG. 4, the x-axis 400 would be one of the two spatial axes in the large image. The y-axis 401 in FIG. 4 would be some measure of the magnitude of the elements of D (norm squared of D) indicating a distance measure of the sample image from the true object ($\|D\|^2=\|A_m-A_k\|^2$). At the point 402 in FIG. 4, this is, most likely, the x coordinate of the spatial position in the large image where the object was located. Thus, by looking at the norm squared of the difference matrix D, we can identify the spatial position in the original image (both x and y direction) where the object most likely would be found. This will occur when $\|D\|^2$ may suddenly get much smaller. Again, the term $\|D\|^2$ term is a distance metric between the two matrices $A_m$ and $A_k$ which relates their closeness via:

$$\|D\|^2=\|A_m-A_k\|^2 \to 0 \qquad \text{Eq 1}$$

and when $\|D\|^2$ rapidly decreases, then $A_m=A_k$ and the object $A_k$ is discovered in the original image at the spatial coordinates of $A_m$. The original assumption is that the matrix $A_k$ is a noise free image and is defined as the training matrix. The sample matrix $A_m$ occurs in the received data and is also initially considered to be essentially noise free.

The overall method is presented by first describing the six steps of the algorithm of the present invention useable in a central processing unit of a digital imaging system.

Step 1: Obtain eight training images (in different orientations) of the object $A_k$.

Step 2: Determine the image histograms (frequency versus brightness levels) for each of the eight training images in Step 1. These histogram functions are $f_1(x), \ldots, f_8(x)$.

Step 3: Sweep through the test image/matrix. For a sample $A_m$ of the same size as the original eight $A_k$ matrices, determine its sample histogram $f_m(x)$ of $A_m$.

Step 4: The new difference matrix $D_1$ (size 256×8) is defined via:

$$D_1(x)=[f_m(x)-f_1(x), f_m(x)-f_2(x), \ldots, f_m(x)-f_8(x)] \qquad \text{Eq 2}$$

Step 5: To find the object in the picture, find when $\|D_1(x)\|$ suddenly may get small. Then, make the image more apparent at the spatial coordinates by a circle indicator described later. This delineates the spatial location which has high propensity for the object to appear.

Figure 1:
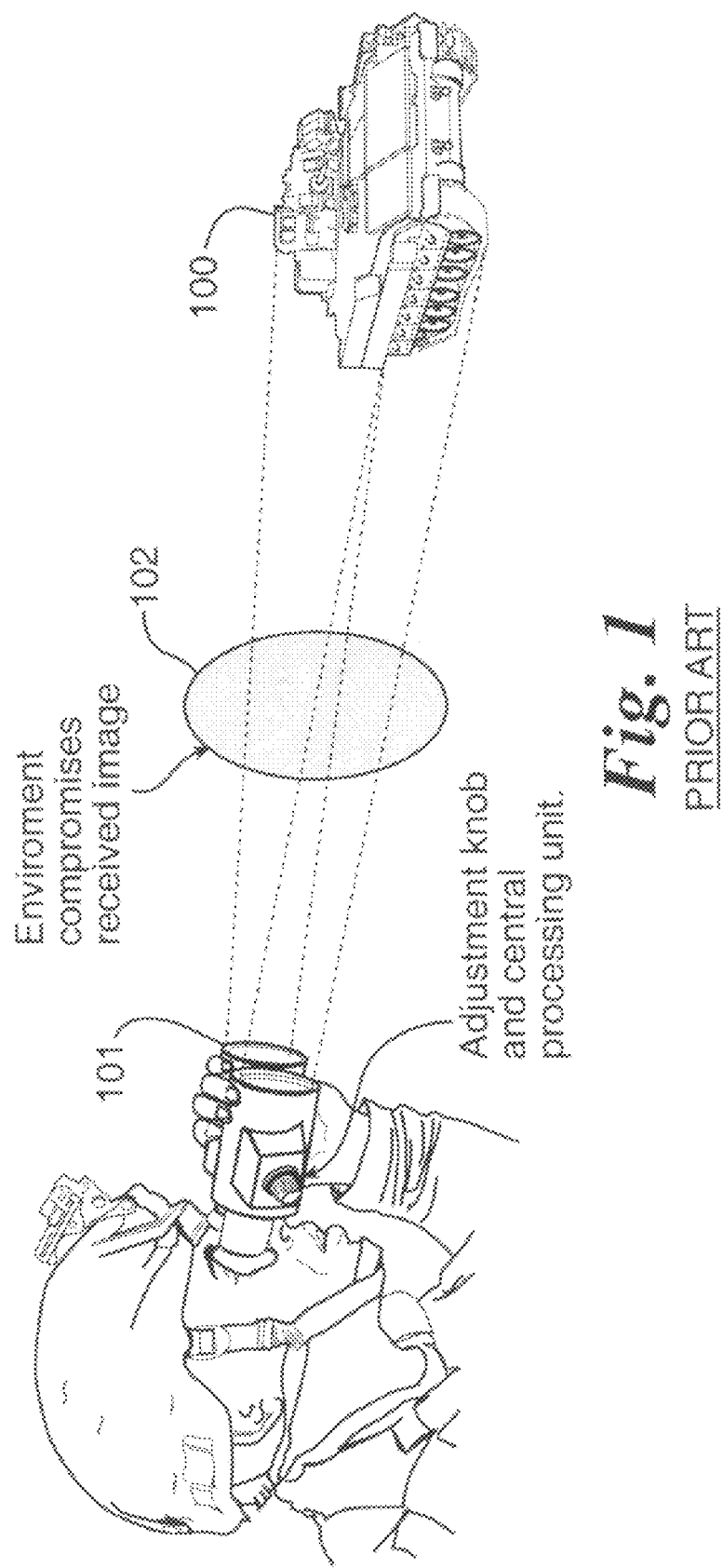
FIG. 1 is a prior art binocular-type digital imaging device.
Figure 2:
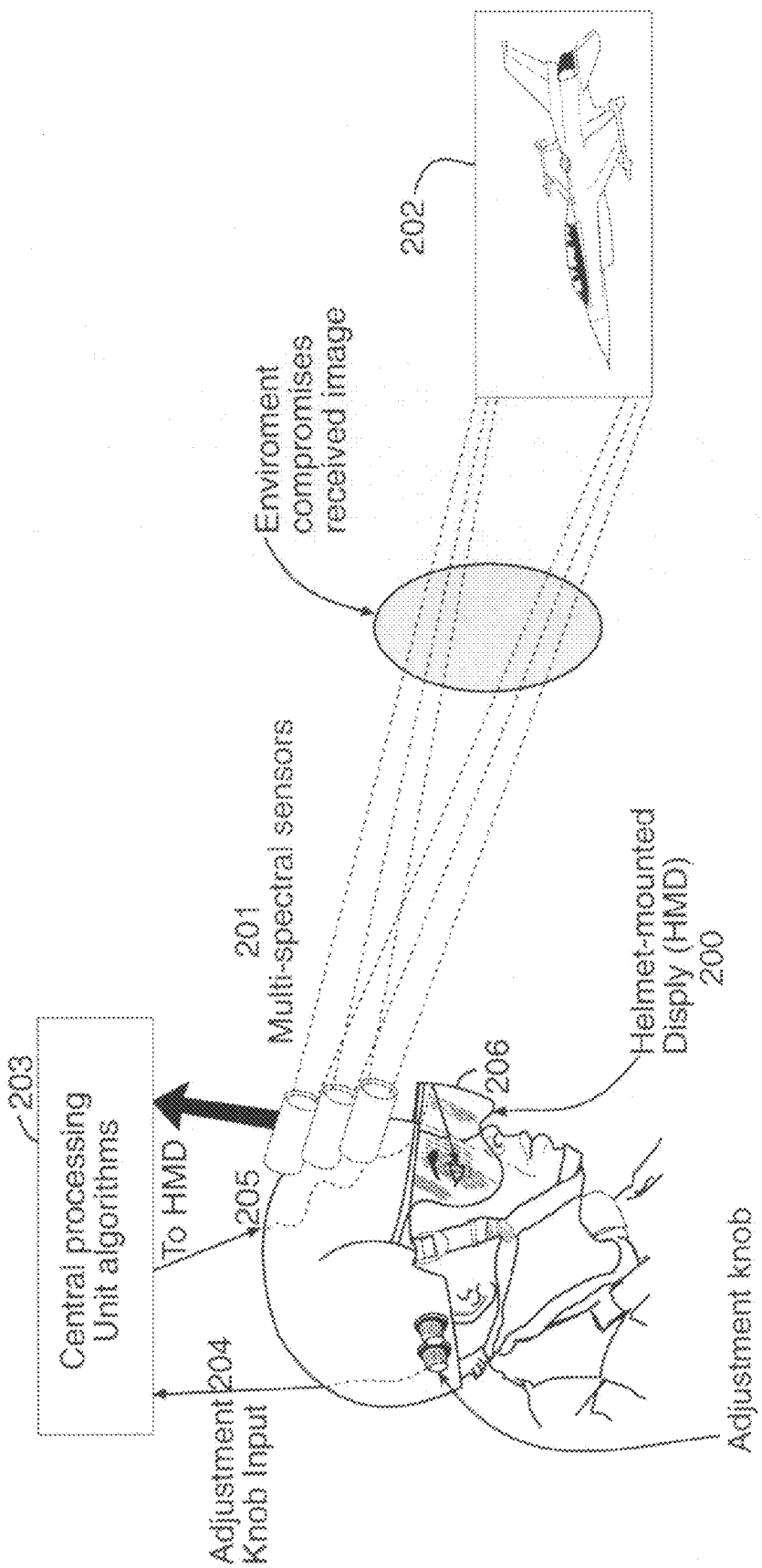
FIG. 2 is a prior art head-mounted display system.

Step 6: Adjust the knob in FIGS. 1 and 2 to account for trained images of different relative sizes. This adjustment mechanism modifies the $f_1(x), \ldots f_8(x)$ terms in Eq 2 by a scale factor K.

It should be emphasized that the new difference matrix $D_1$ is much smaller than D yet still contains all the relevant information on rotation and scaling of the object. The $f_1(x), \ldots, f_8(x)$ represent the "profile" or "signature" of the object containing its relevant and constituent information. The next section will work an example in full detail to show how to use this procedure both with respect to the orientation of the object and also for the scale factor adjustment involving range errors.

Application to a Rotated Image

Figure 12:
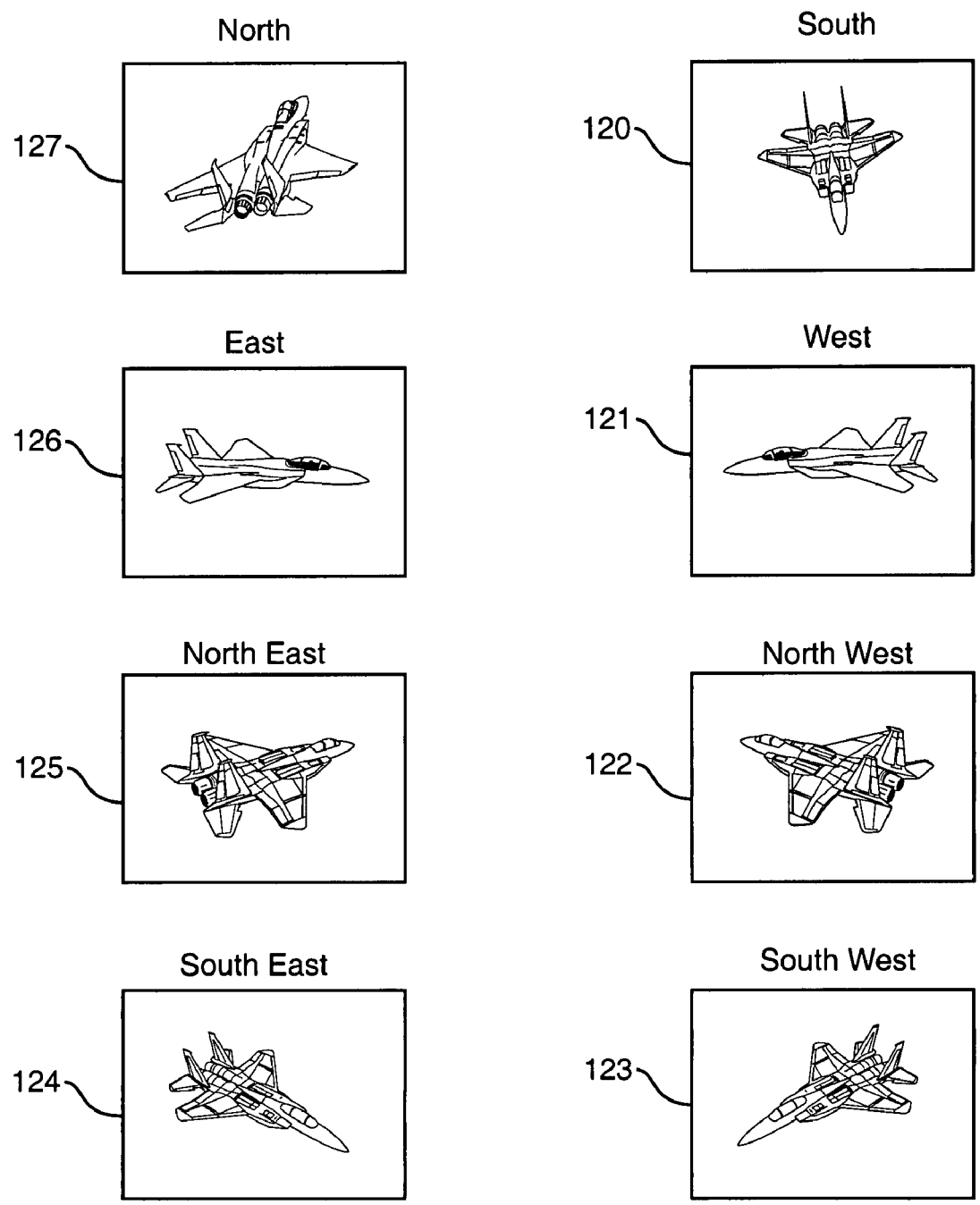
FIG. 12 shows eight possible orientations of a training image.
Figure 13:
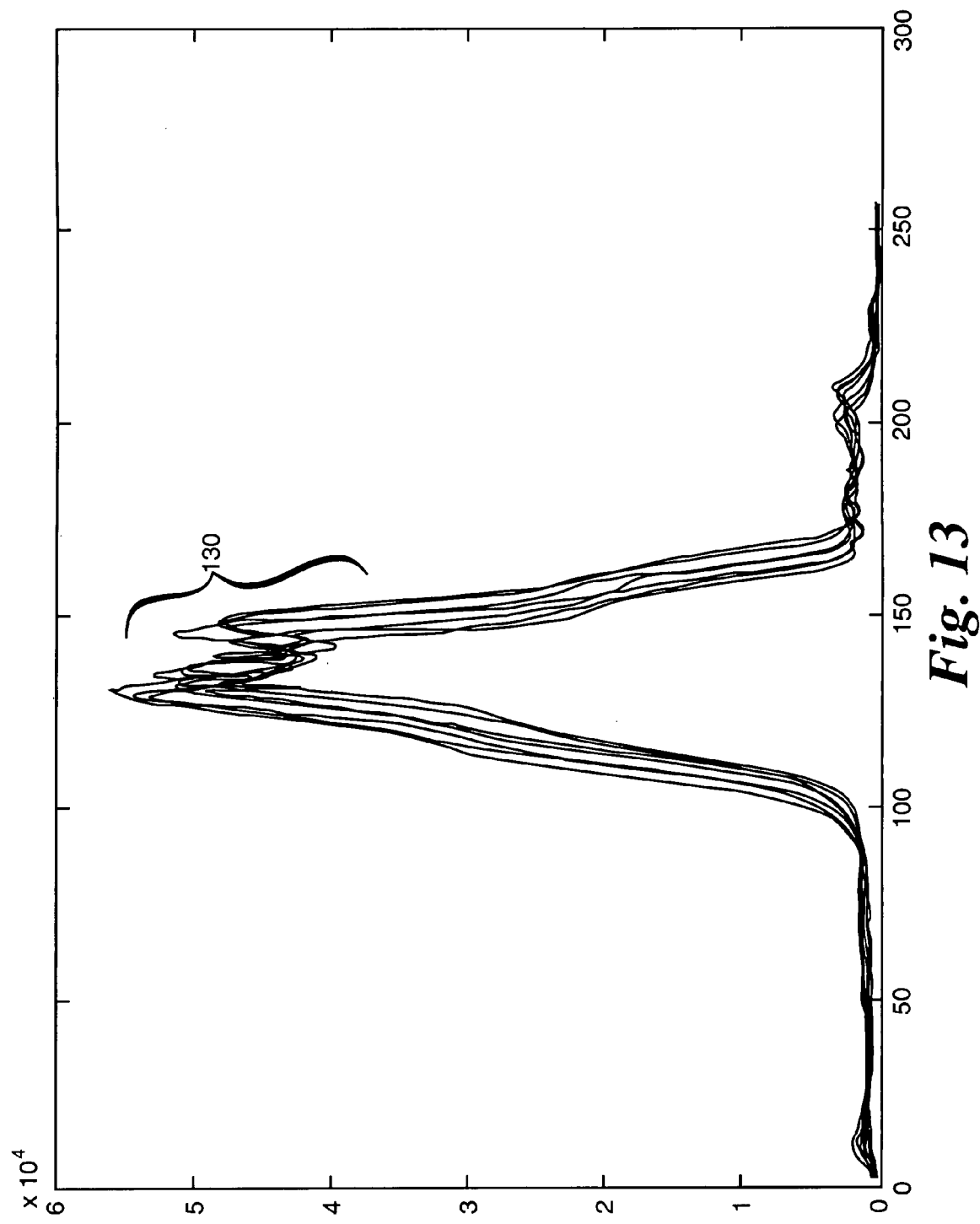
FIG. 13 shows a plot of all eight histograms of the training images from FIG. 12.
Figure 14:
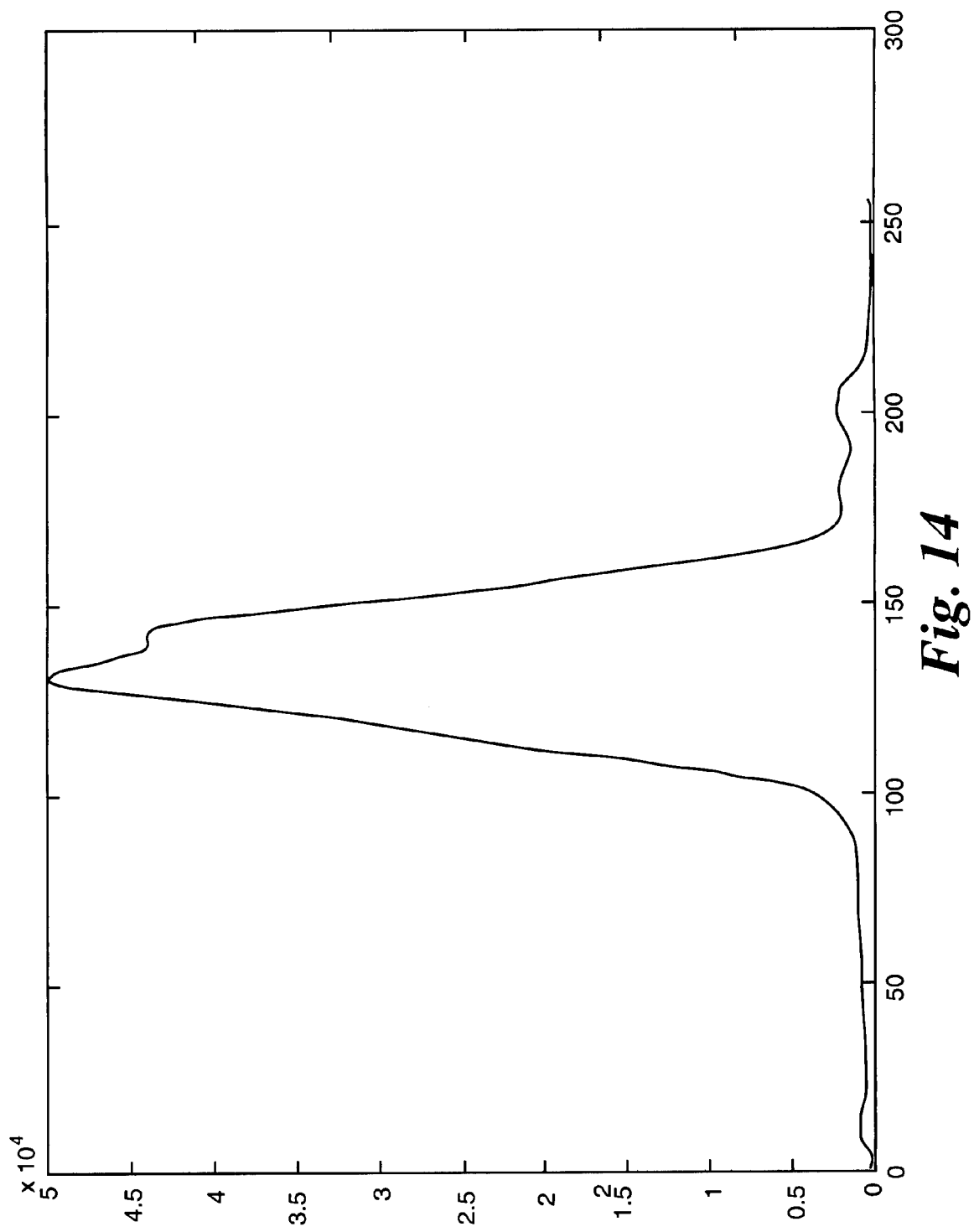
FIG. 14 shows a plot of a signature profile of an object.
Figure 15:
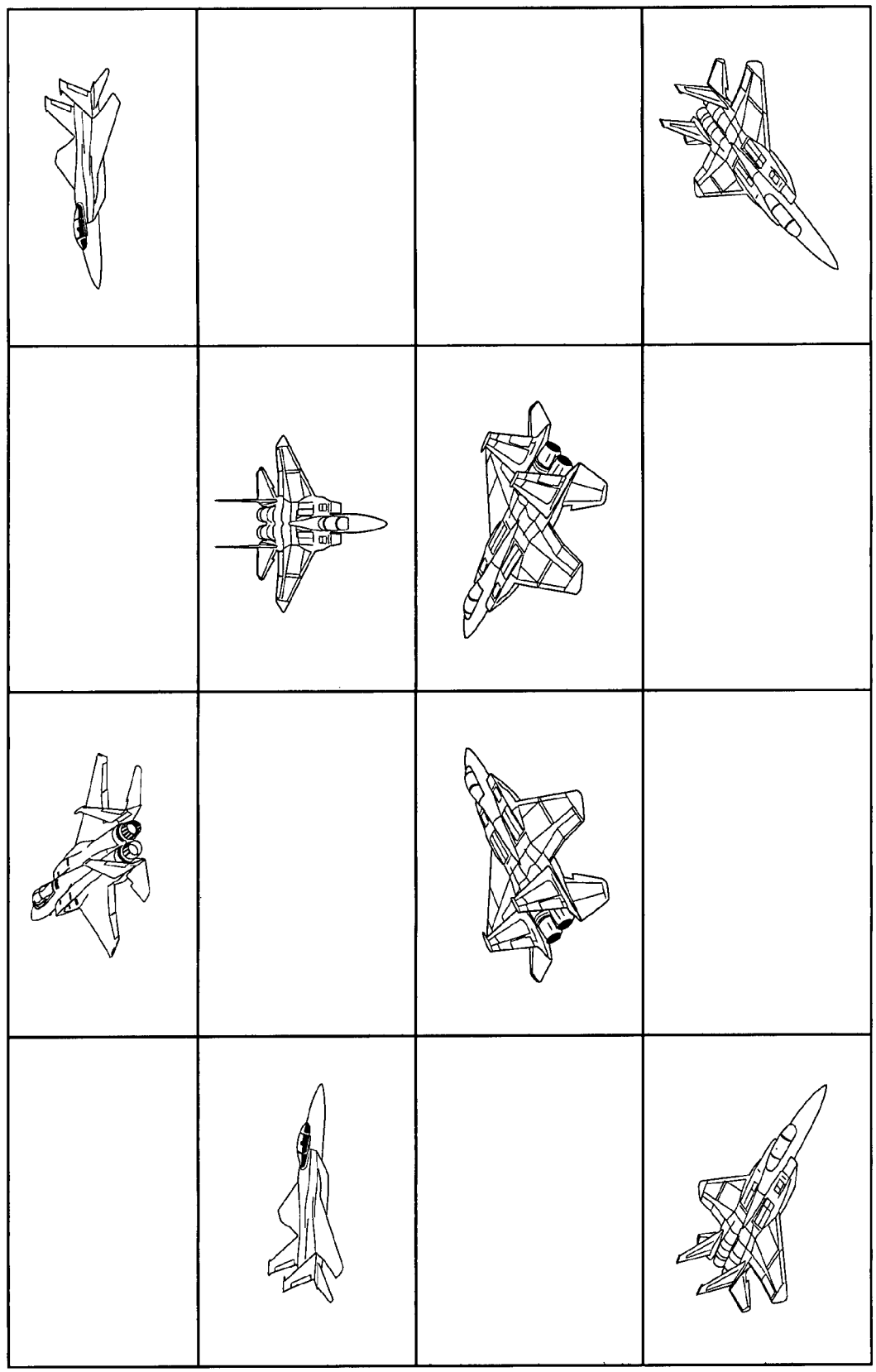
FIG. 15 shows test image for location of an object in any possible orientation.
Figure 16A:
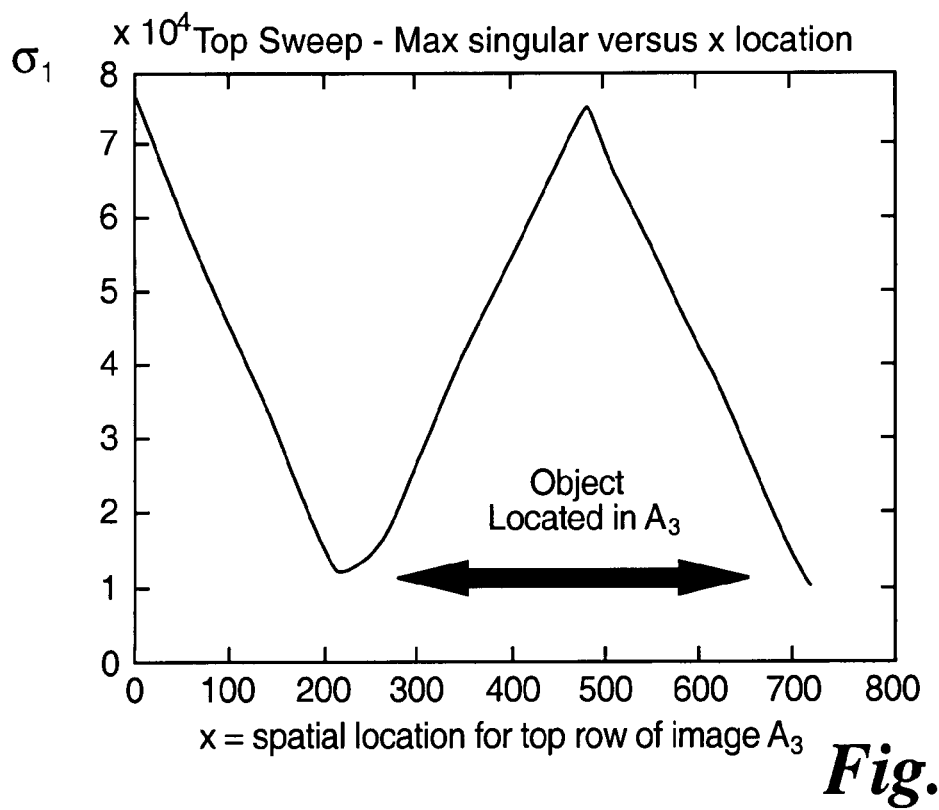
FIG. 16a is a plot of test image $A_3$, $\sigma_1$ versus spatial location for the top row of image $A_3$.
Figure 16B:
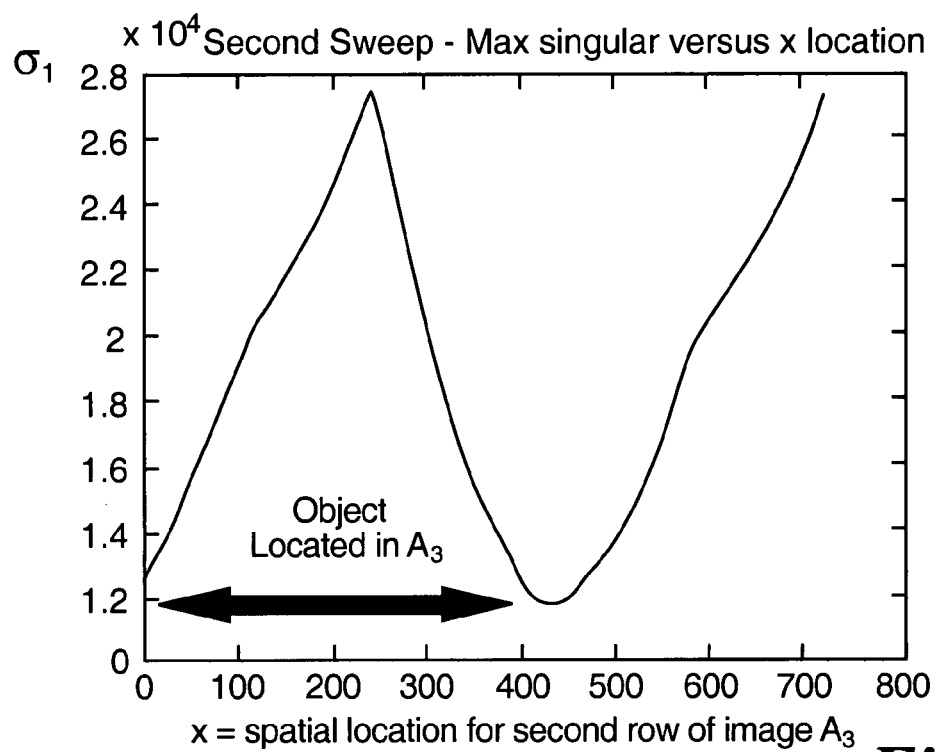
FIG. 16b is a plot of test image $A_3$, $\sigma_1$ versus spatial location for the second row of image $A_3$.
Figure 17A:
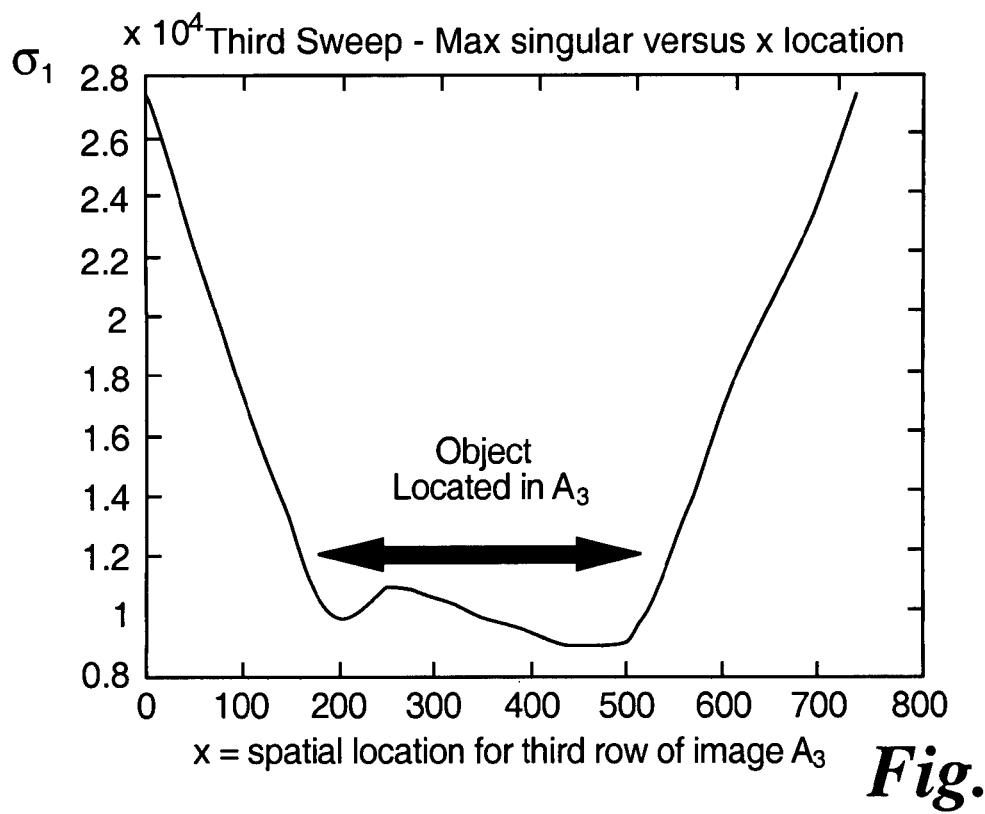
FIG. 17a is a plot of test image $A_3$, $\sigma_1$ versus spatial location for the third row of image $A_3$.
Figure 17B:
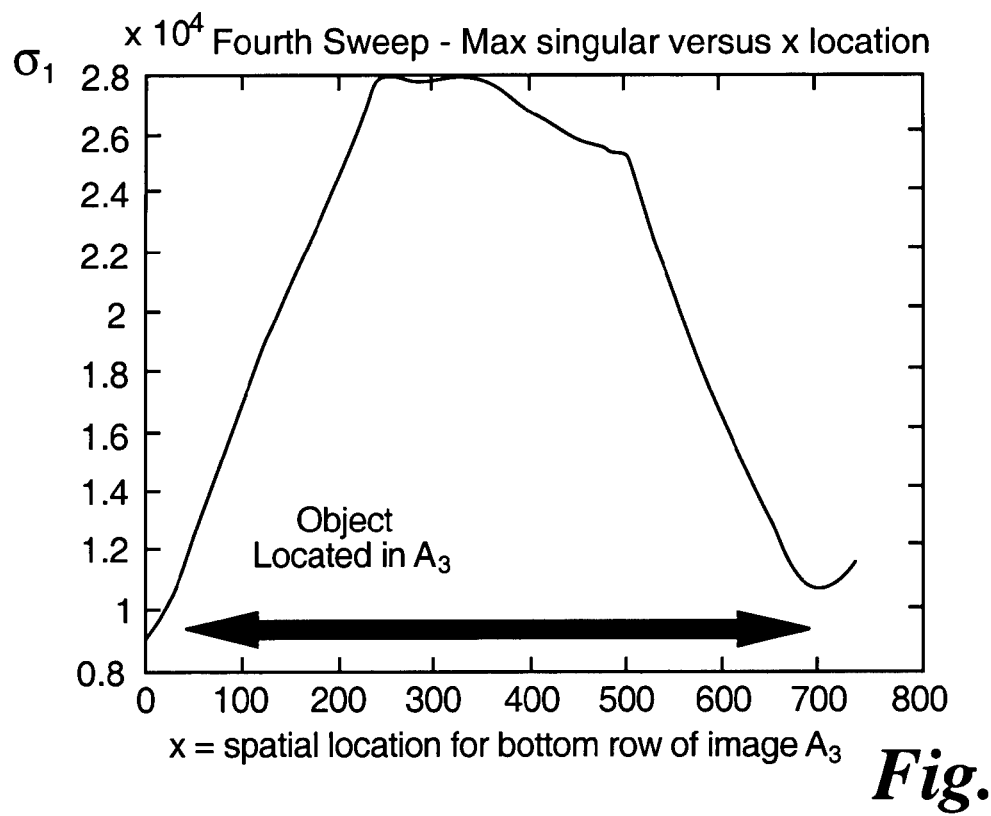
FIG. 17b is a plot of test image $A_3$, $\sigma_1$ versus spatial location for the bottom row of image $A_3$.
Figure 18A:
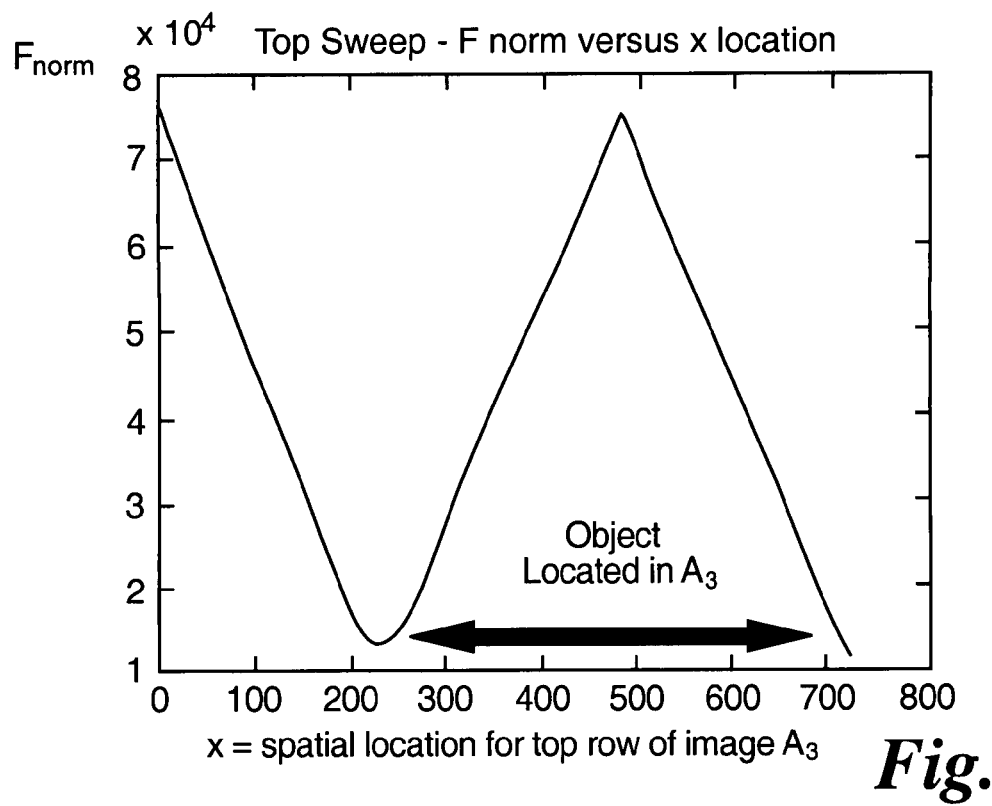
FIG. 18a is a plot of test image $A_3$, $F_{norm}$ versus spatial location for the top row of image $A_3$.
Figure 18B:
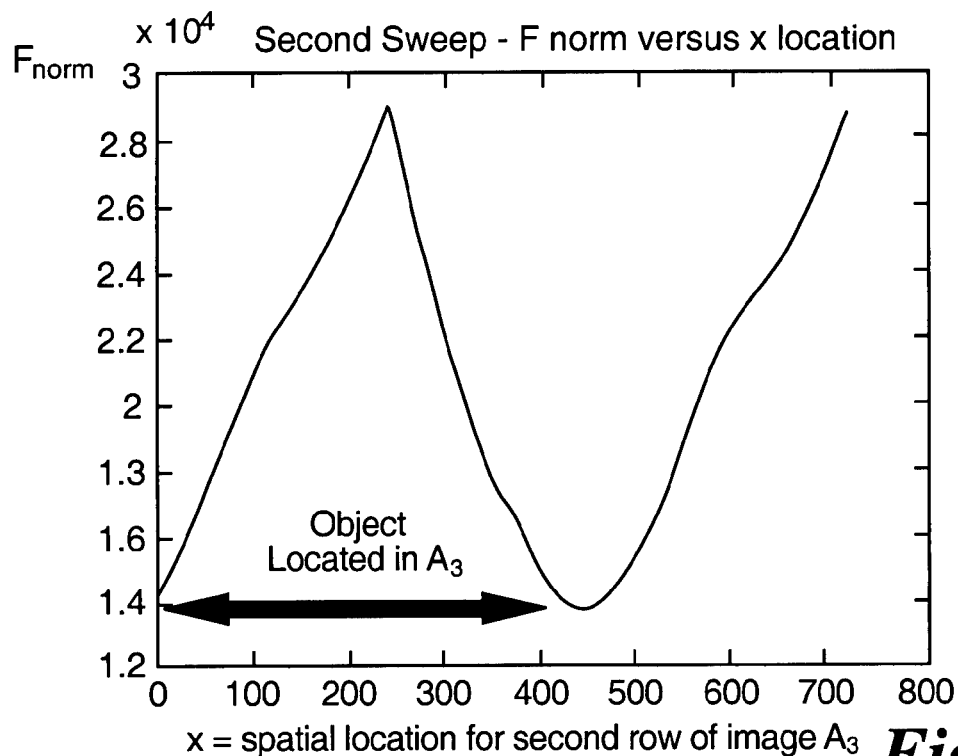
FIG. 18b is a plot of test image $A_3$, $F_{norm}$ versus spatial location for the second row of image $A_3$.
Figure 19A:
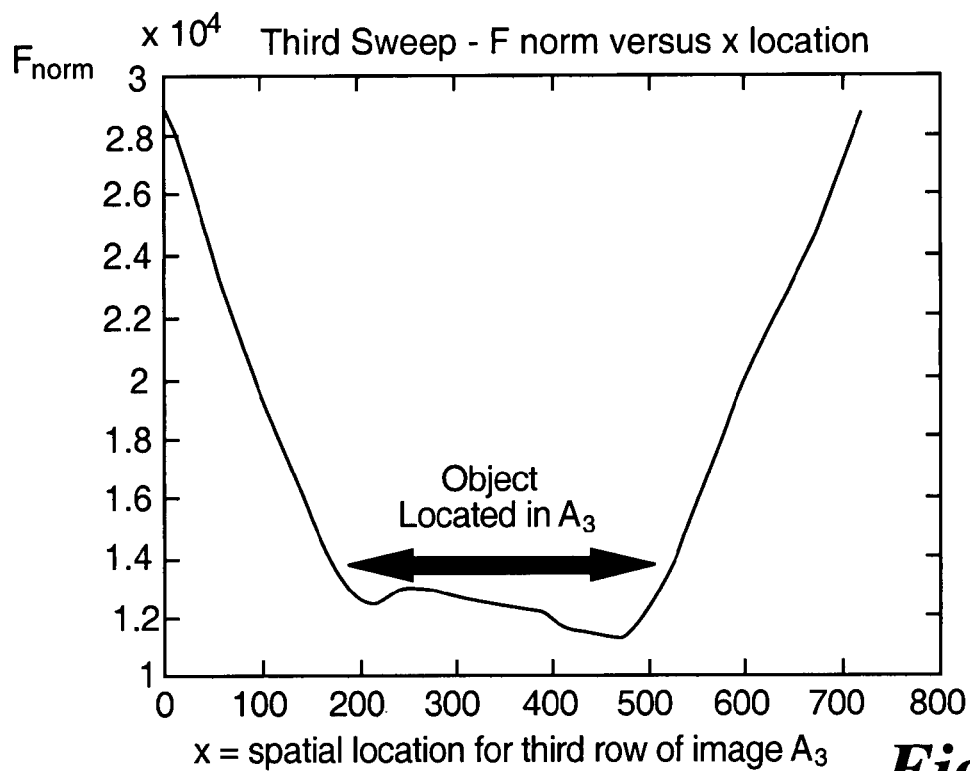
FIG. 19a is a plot of test image $A_3$, $F_{norm}$ versus spatial location for the third row of image $A_3$.
Figure 19B:
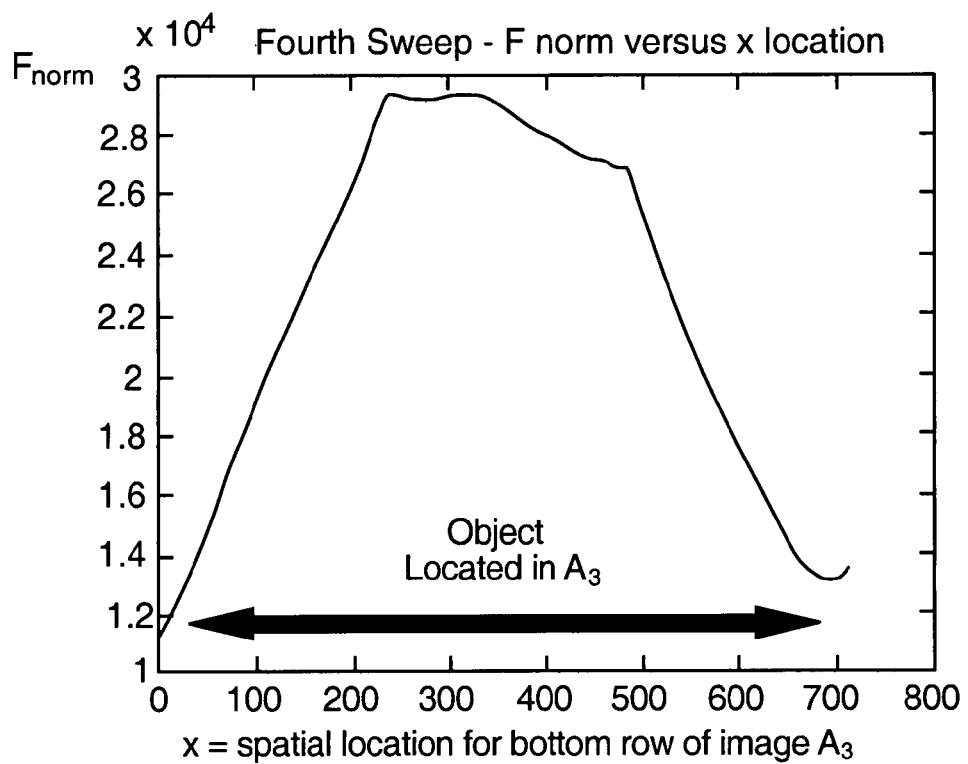
FIG. 19b is a plot of test image $A_3$, $F_{norm}$ versus spatial location for the bottom row of image $A_3$.

An example illustrates the methodology of the present invention and how its versatility extends to both rotated objects and to objects that were initially wrongly sized. FIG. 12 shows the eight views of the training image that we wish to identify in any possible scene. Images taken are south, west, northwest, southwest, northeast and south east illustrated at 120-127, respectively in FIG. 12. FIG. 13 illustrates a plot of the all eight histograms of the eight training images of FIG. 12. The original assumption is that 8 possible rotations were to be used in the test image. This number could be reduced to 4 rotations (reducing computation time and saving memory, but with a possible increase in error rate in detection) or increased to 12, 16 or any number of other rotations to improve accuracy. FIG. 13 superimposes and summarizes all eight histograms of each of the eight possible rotations. It is noted in FIG. 13 at 130 that the histograms are remarkably similar in shape even though each of the figures is rotated. The present invention takes advantage of the fact that such histograms have this shape similarity. FIG. 14 shows the average histogram of the eight histograms of FIG. 13, or the signature profile of the object of interest. In FIG. 15, the test object is embedded in the data test image and rotated in all the possible eight orientations. This is the "baseline" or "test image" for all possible rotations and becomes the basis for identifying an object in any possible rotational position. FIGS. 16a and 16b are plots of test image $A_3$, $\sigma_1$ versus spatial location for the top and second row of image $A_3$ from FIG. 15. FIGS. 17a and 17b are plots of test image $A_3$, $\sigma_1$ versus spatial location for the third and bottom row of image $A_3$. FIGS. 18a and 18b are plots of test image $A_3$, $F_{norm}$ versus spatial location for the top and second row of image $A_3$ from FIG. 15. FIGS. 16-17 show the plots of the $L_2$ norm of $D_1$ and FIGS. 18-19 show the plot of the Frobenius norms. It is clear that in any possible rotation the methodology of the present invention has the desired efficacy. Where the traditional methods failed previously, the present invention does not fail due to the rotation of the object because the training data image now includes the relevant rotational information.

Knob-Adjustment

Figure 20:
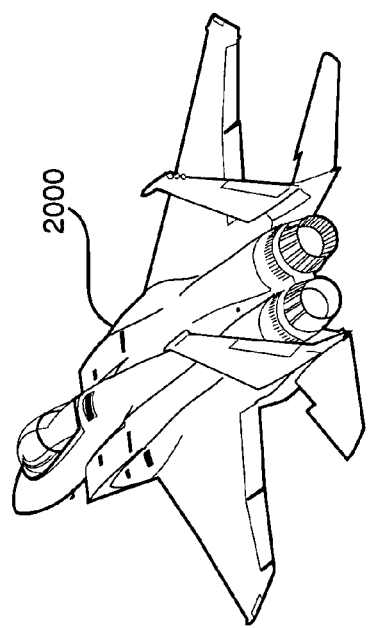
FIG. 20 shows a full-sized image to test for scale-range effects.
Figure 21A:
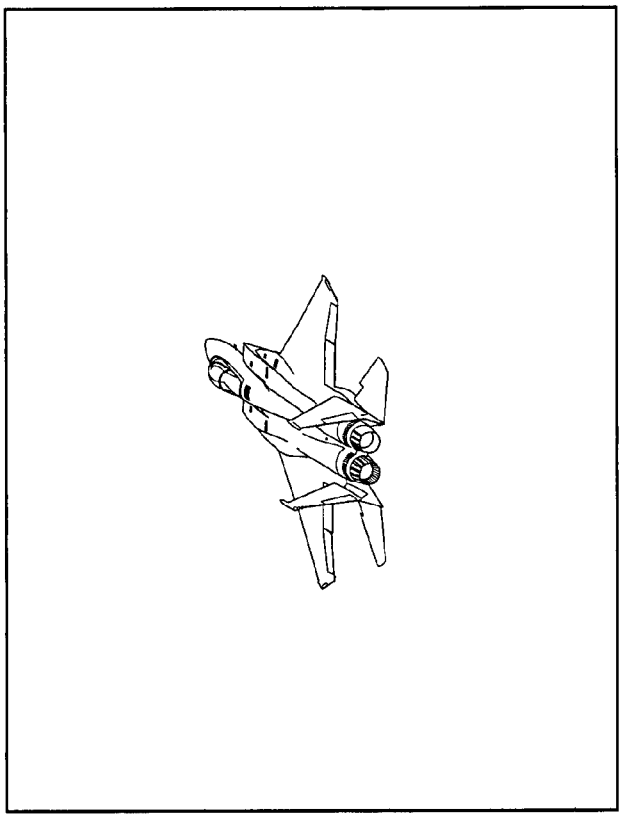
FIG. 21a shows a 50% of full-sized image to test for scale-range effects.
Figure 21B:
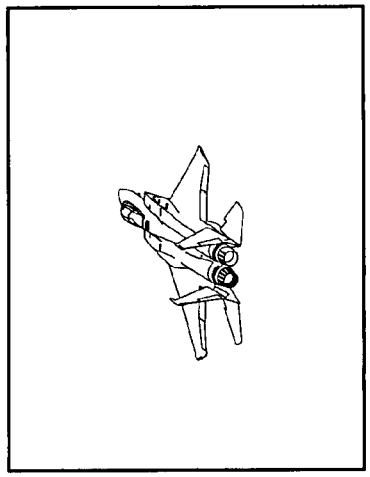
FIG. 21b shows a 30% of full-sized image to test for scale-range effects.
Figure 21C:
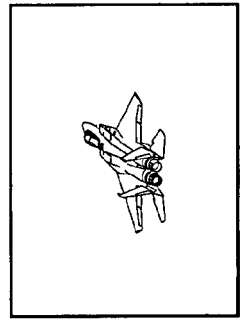
FIG. 21c shows a 20% of full-sized image to test for scale-range effects.
Figure 21D:
FIG. 21d shows a 10% of full-sized image to test for scale-range effects.
Figure 21E:
FIG. 21e shows a 5% of full-sized image to test for scale-range effects.

In the present invention, a knob adjustment feature of digital imaging systems impacts the scale-range effect. Adjustment knobs allow an operator to change some aspect of the algorithm used in the preferred arrangement of the invention. The adjustment knob modifies the maximum number of histograms by scaling the plot of $f_i(x)$, i=1, . . . , 8 (the histogram plots of the test images) by a scale factor K but preserves the shape of the histograms (the "profile" or "signature"). A novel aspect of the present invention is the similarity of the shape of the histograms of the test image, independent of the size. FIG. 20 shows a test image, 2000, at full size and FIGS. 21a-21e show other various sizes, 50% of full size, 30% of full size, 20% of full size, 10% of full size and 5% of full size, respectively.

Figure 22:
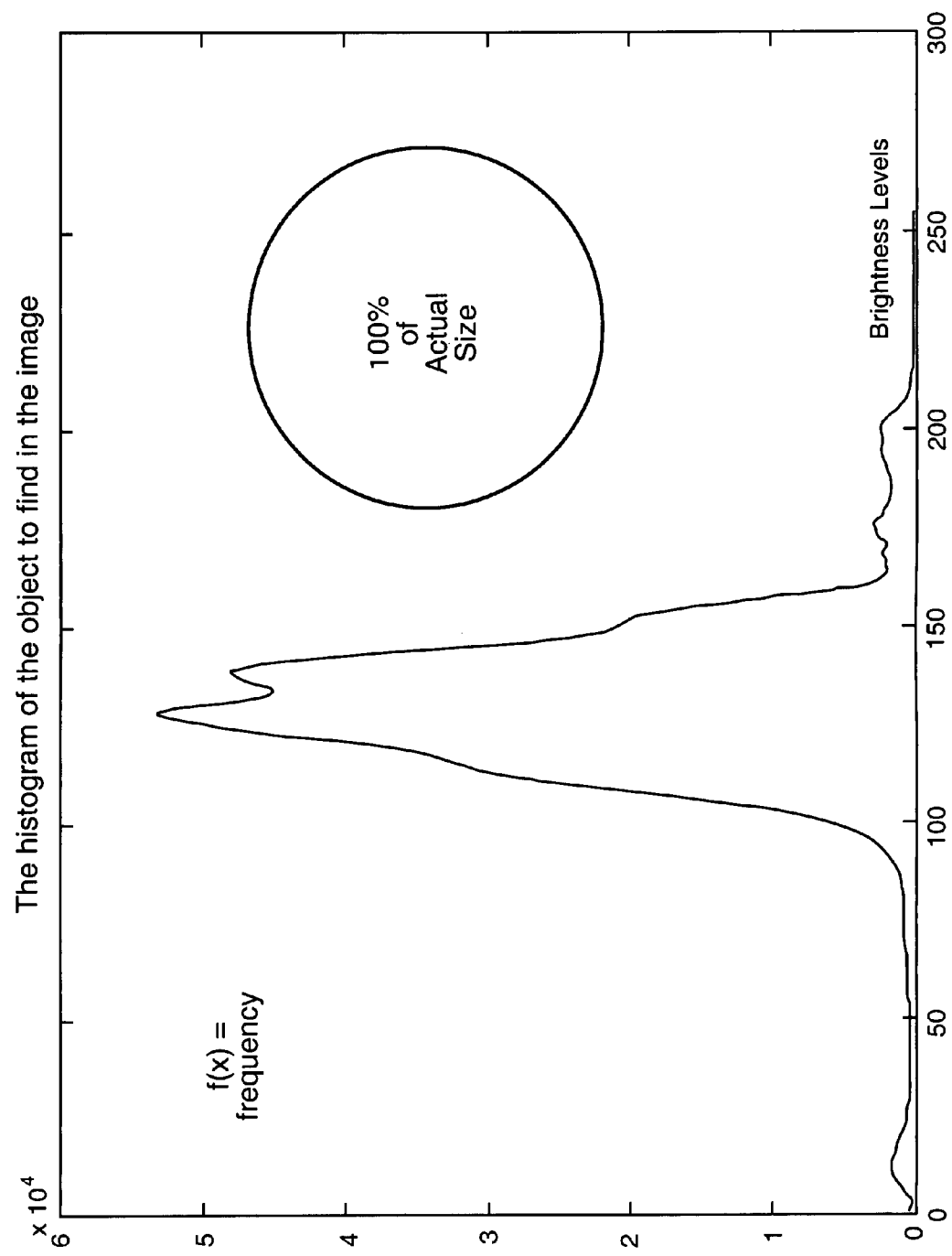
FIG. 22 shows a histogram of 100% baseline image in FIG. 20.
Figure 23:
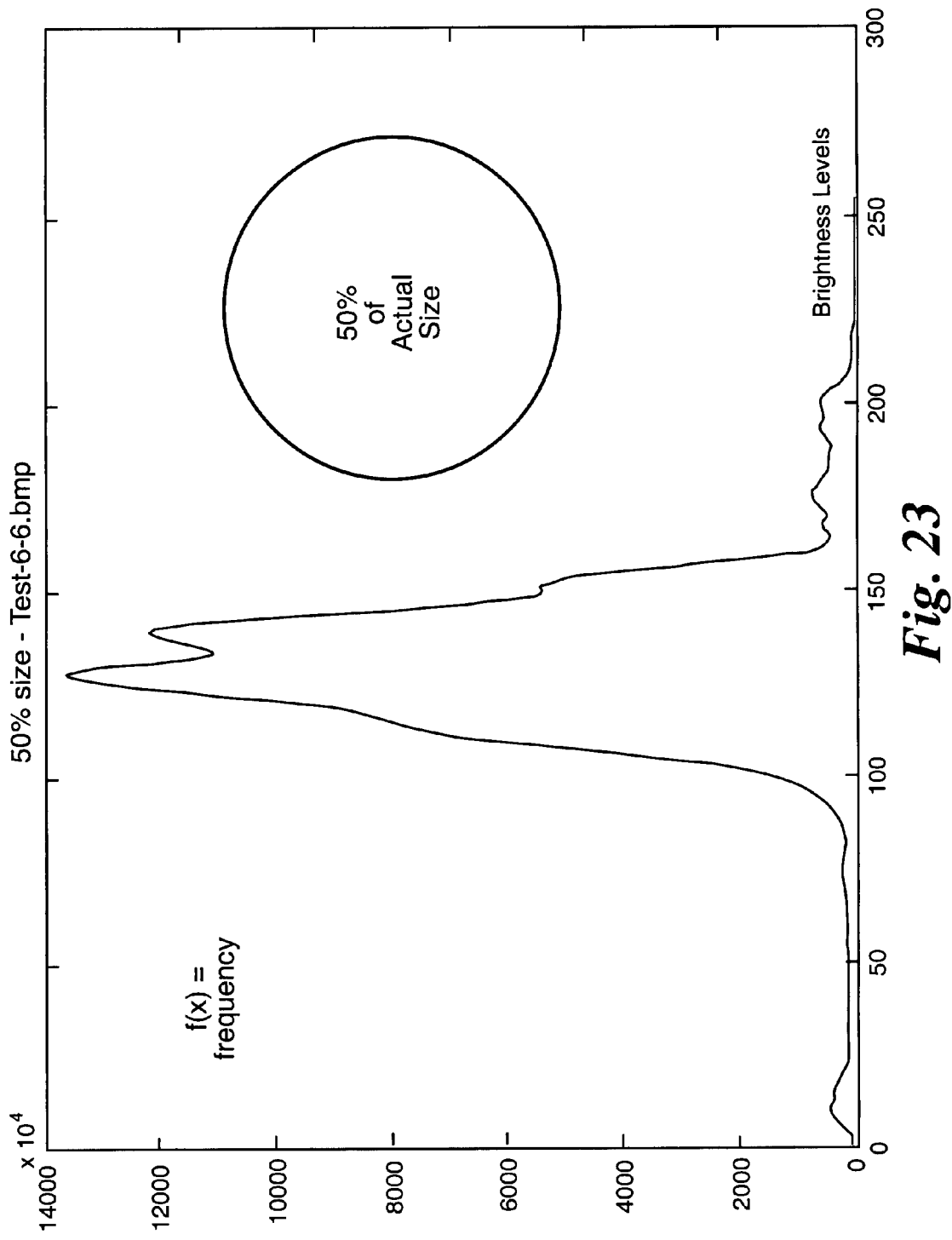
FIG. 23 shows a histogram of 50% of size image in FIG. 20
Figure 24:
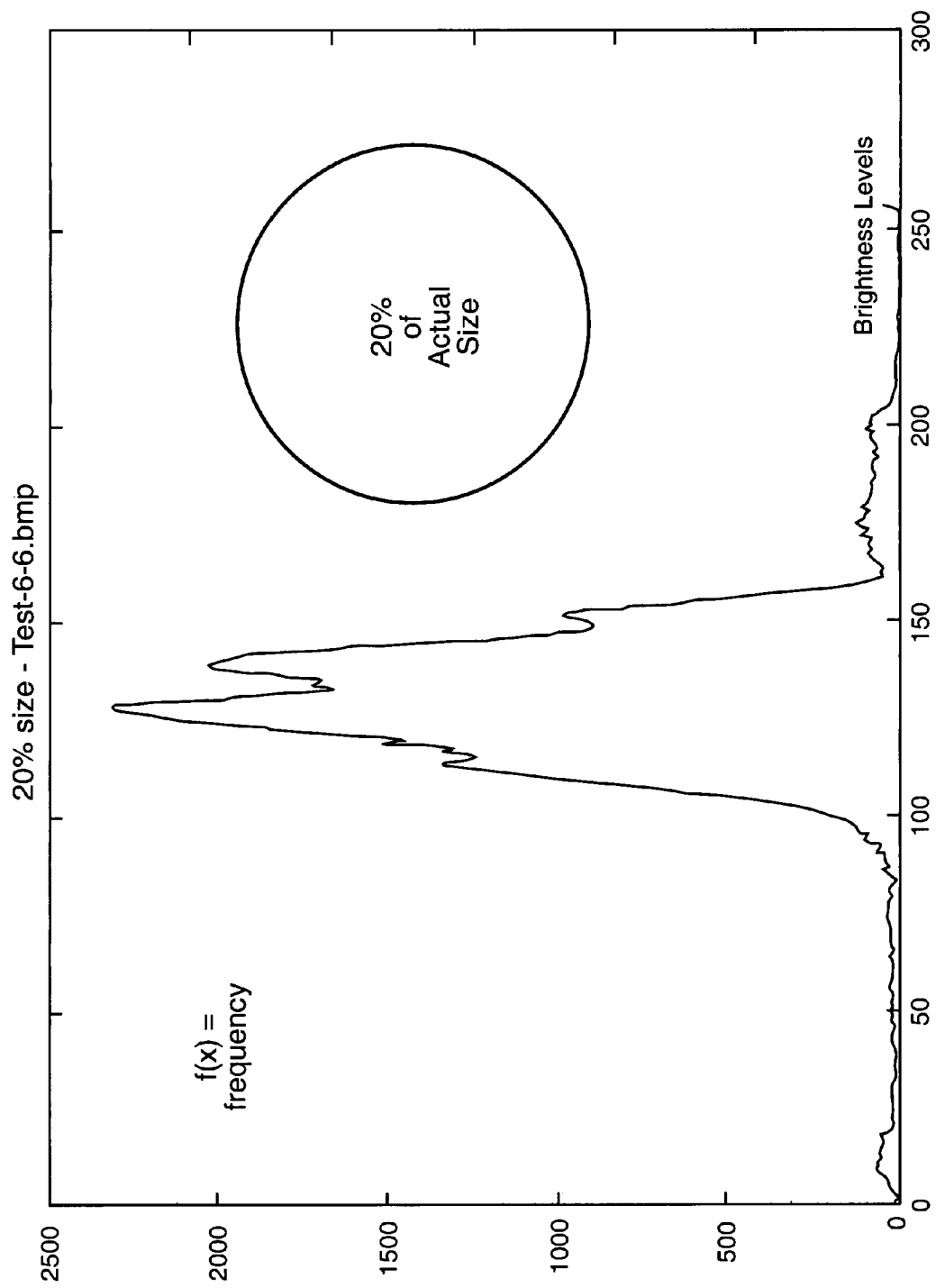
FIG. 24 shows a histogram of 20% of size image in FIG. 20
Figure 25:
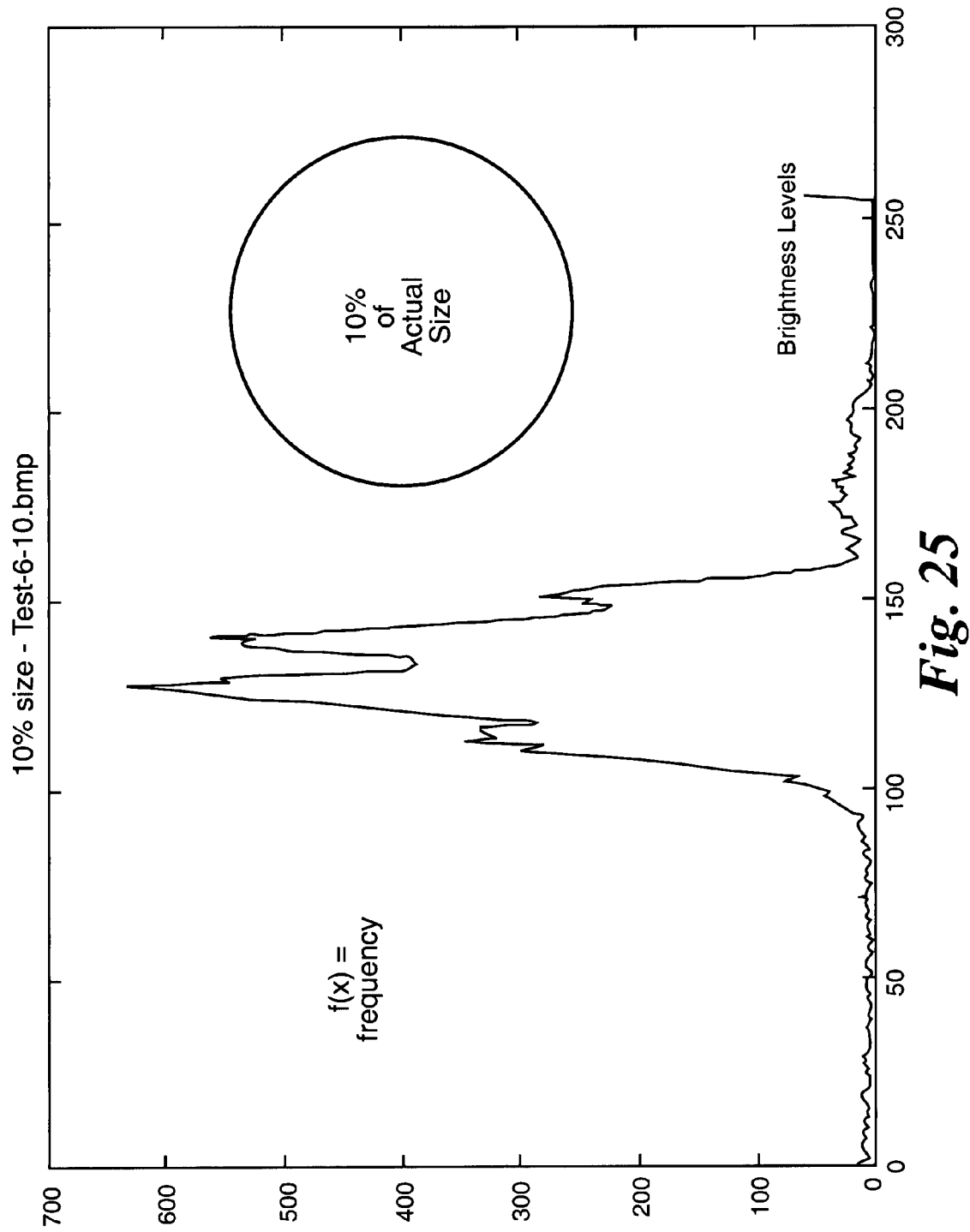
FIG. 25 shows a histogram of 10% of size image in FIG. 20.
Figure 26:
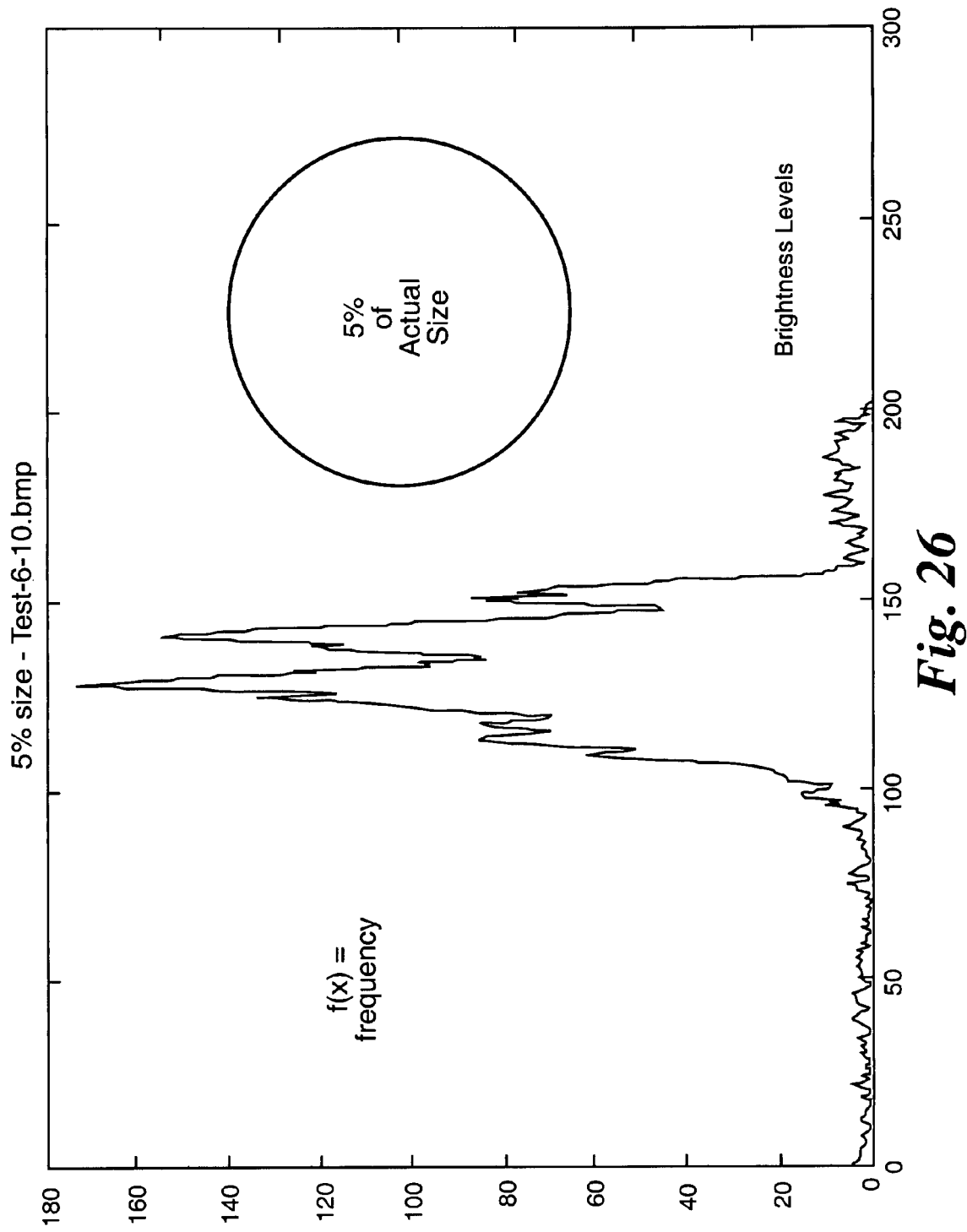
FIG. 26 shows a histogram of 5% of size image in FIG. 20.

FIGS. 22-26 portray how similar the histograms of these candidate test images are in terms of the shape of their histogram curves. FIG. 22 shows a histogram of 100% of the baseline image in FIG. 20, FIG. 23 shows a histogram of 50% of the baseline image in FIG. 20, FIG. 24 shows a histogram of 20% of the baseline image in FIG. 20, FIG. 25 shows a histogram of 10% of the baseline image in FIG. 20, and FIG. 26 shows a histogram of 5% of the baseline image in FIG. 20. The count of the pure white pixels (color=1.0 or 256) have been removed to reduce bias effects.

Table 1 shows what reciprocal factor (to multiple each histogram to get equivalences) such that the five sized pictures would be similar.

TABLE 1

The Knob Adjustment Rule for Scaling the Image Size

| Image size = $A_k$ | Maximum frequency of $f(x)$ = histogram | Scale Factor = K |
|---|---|---|
| Size 1 = Full size = 100% (720 × 960) | 54,000 | 1.0 (baseline) |
| Size 2 = 90% of full size. (648 × 864) | 43,000 | 0.80 |
| Size 3 = 80% of full size. (576 × 768) | 34,500 | 0.64 |
| Size 4 = 70% of full size. (504 × 672) | 26,500 | 0.49 |
| Size 5 = 60% of full size. (432 × 576) | 19,500 | 0.36 |
| Size 6 = 50% of full size. (360 × 480) | 13,700 | 0.25 |
| Size 7 = 40% of full size. (288 × 384) | 8,800 | 0.16 |
| Size 8 = 30% of full size. (216 × 288) | 5,000 | 0.09 |
| Size 9 = 20% of full size. (144 × 192) | 2,350 | 0.04 |
| Size 10 = 10% of full size. (72 × 96) | 625 | 0.0116 |
| Size 11 = 5% of full size. (36 × 48) | 170 | 0.00315 |

Table 1 portrays the rationale of the knob adjustment rule. As the size of the object decreases, the shape of the histogram plot remains similar to FIG. 14, the average histogram or "object signature" or "profile." However the maximum frequency of the histogram plot scales down by an adjustment rule as the image size changes. This is the basis of the knob mechanism aspect of the present invention where the $f_1(x), \ldots, f_8(x)$ are modified (in a similar manner by the scale factor K) based on the maximum number of histograms in Table 1.

Figure 27:
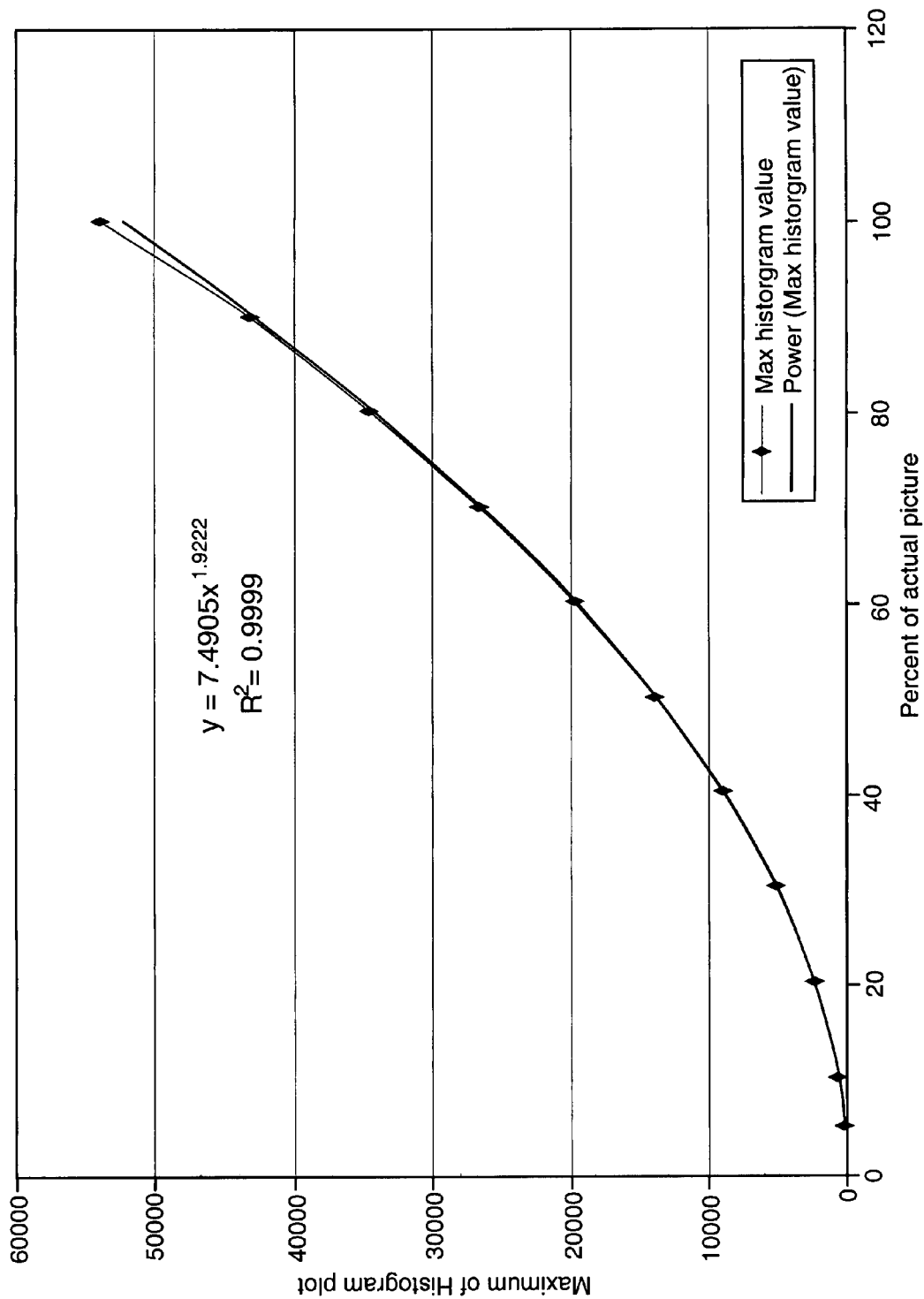
FIG. 27 shows a plot of determination of the K scale factor for an adjustment knob.

This can be expressed as:

$$f_i(x) = K_j * f_i(x) \text{ for range correction (for } i=1, \ldots, 8, j=1, \ldots 11) \quad \text{Eq 3}$$

and $$K_j(s) = 7.49 * (s/100)^{1.9} \quad \text{Eq 4}$$

where s is the known adjustment. s=100 for full scale size and the operator adjusts $K_j$ accordingly. Thus the effect of K on the $D_1$ matrix is seen through the relationship in equations (10-12) which captures the scale-range effect of different sized objects. FIG. 27 is a least squares fit using the Microsoft Excel polynomial fit. It has determined that 1.9222 is the best fit to the data in a power law sense. The correlation coefficient is $R^2$ of 0.9999 which shows this fit is highly accurate.

The object profile is then scanned for possible range-scale size errors to attempt to minimize this error. Obviously, as the object gets smaller and smaller, this method will eventually break down. The knob adjustment rule, however, allows for reasonable scale-range effects when the objects may not be sized initially by the proper amount. The reason why this works is that the histograms contain valuable information about their shape in identifying objects of various sizes.

Noise and Other Factors

Another factor that must be considered in a preferred arrangement of the invention is noise and other imperfections in the image. For example consider in FIG. 28, the difference matrix, the $\|D\|^2$ metric developed so far to help us detect the object in the image, is now biased by noise or other artifacts in the data. It is noted that if $\|D\|^2$ is not sufficiently smaller than a threshold of value $\gamma_1$, there may be considerable uncertainty as to whether the object has been correctly identified. This is the real world application in which we never get pure zero values for $\|D\|^2$ but it is still necessary to obtain our best guess on the coordinate values where the possible location of the object has the highest propensity to occur. Tests will be made between friendly and hostile images (F-15 versus a scud missile) to examine the different signatures both within and across different classes of assets. The image may be compromised by the addition of noise, having lower light levels, having the object become smaller and smaller, etc. which motivates a number of studies to examine the overall efficacy of the proposed method.

Figure 9:
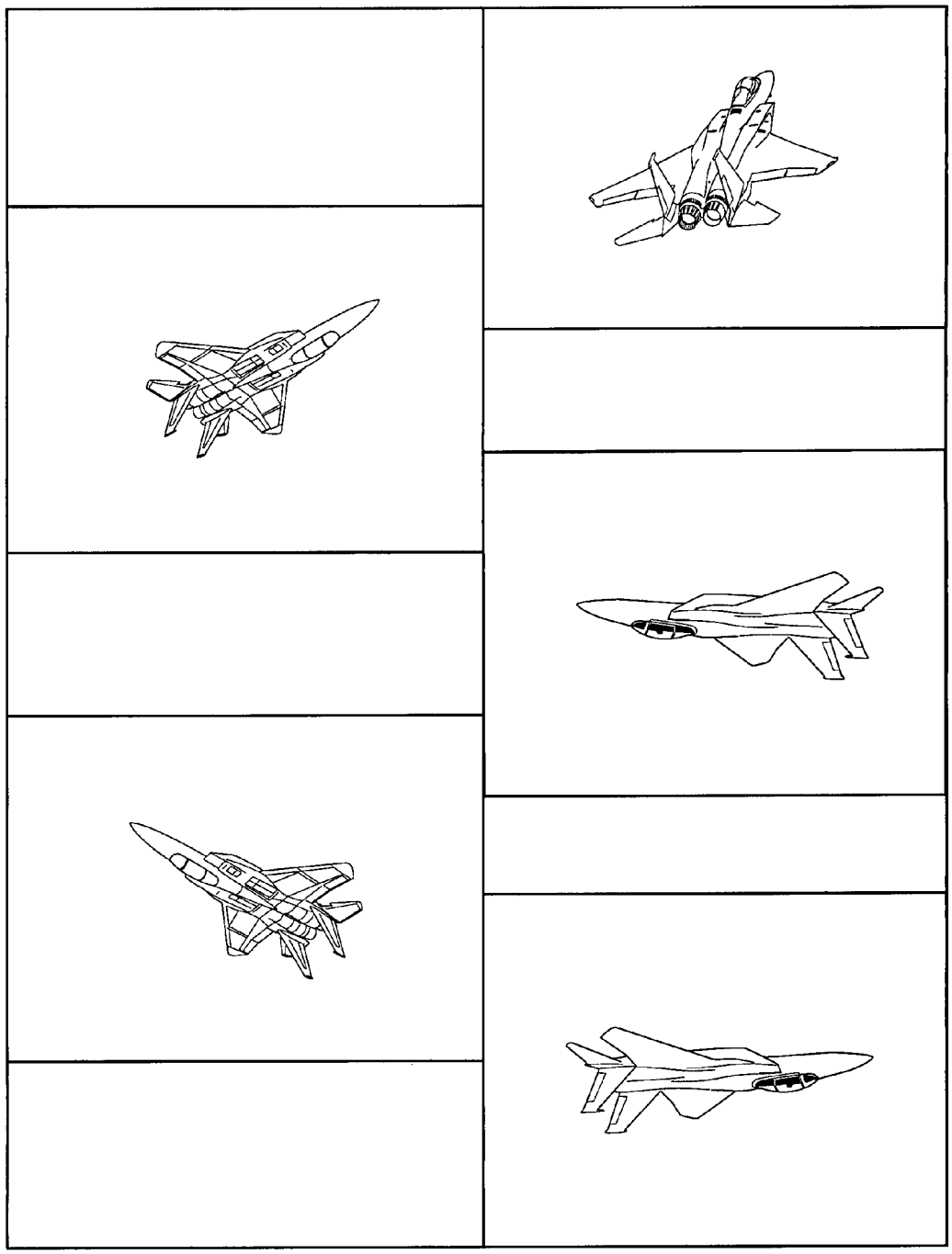
FIG. 9 shows rotated test objects to be identified according to the invention.
Figure 10A:
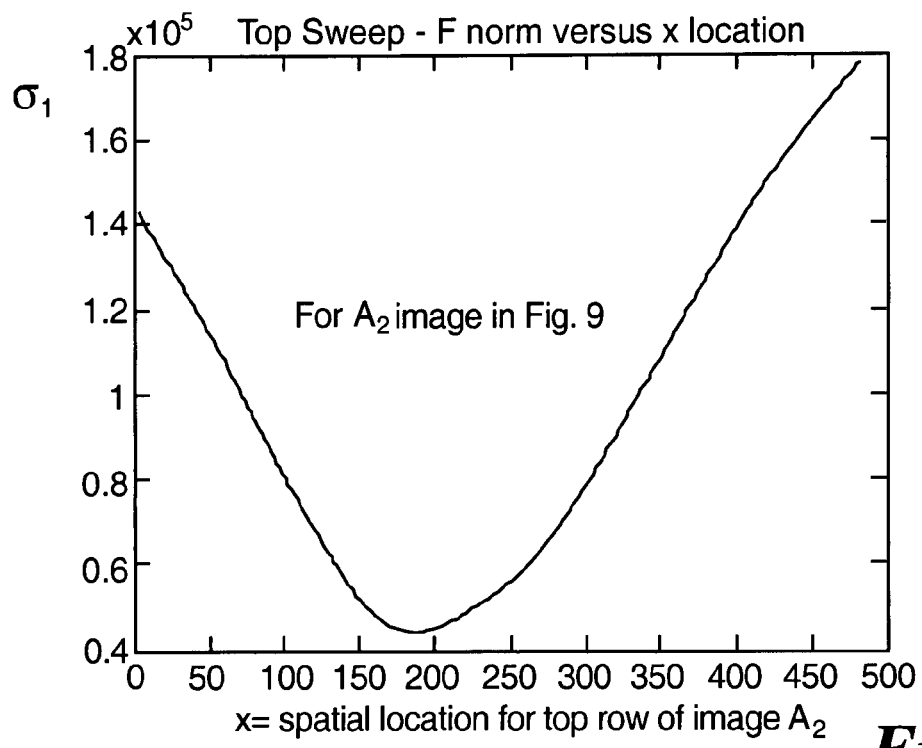
FIG. 10a shows a prior art graph of spatial location for top row of an image.
Figure 10B:
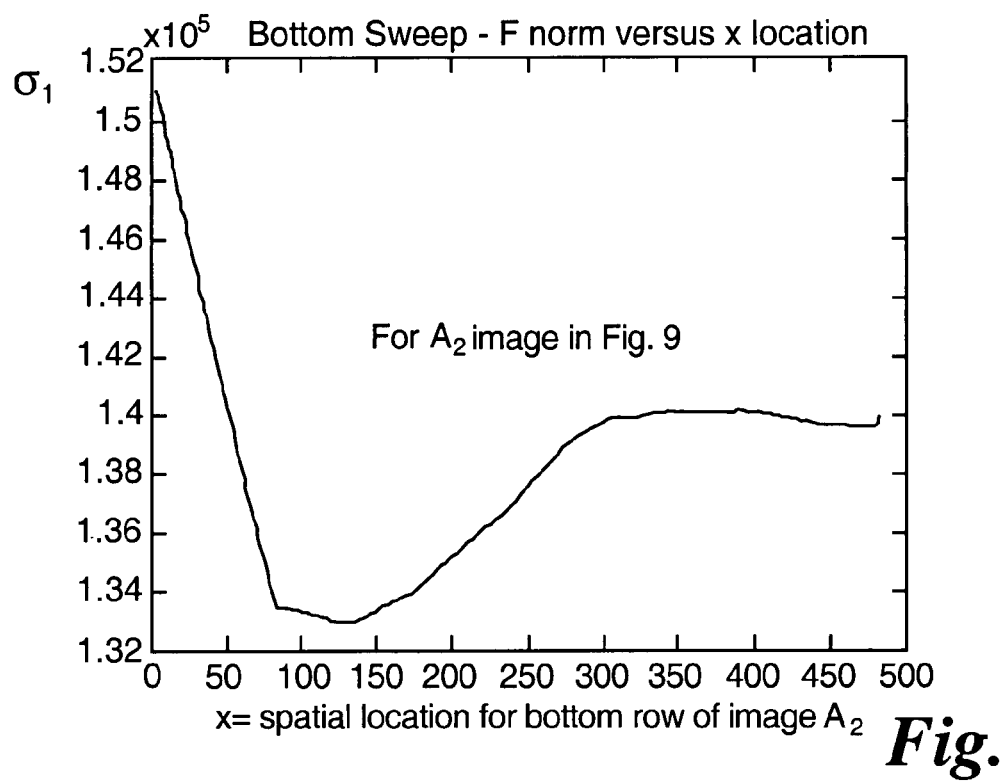
FIG. 10b shows a prior art graph of spatial location for bottom row of an image.
Figure 11A:
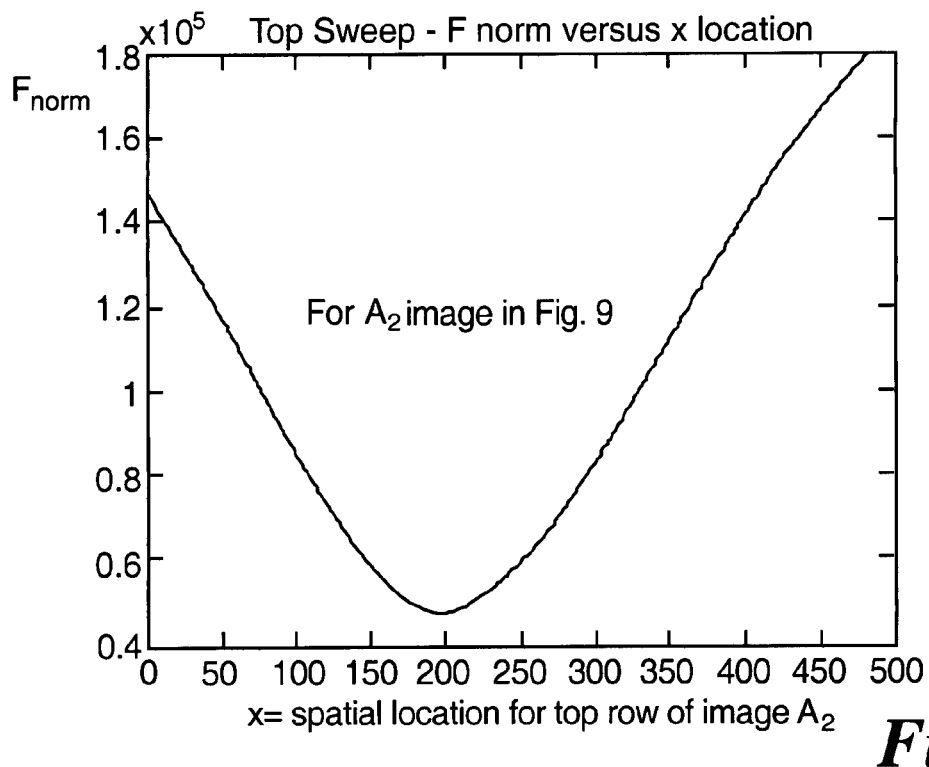
FIG. 11a shows a prior art graph of spatial location for top row of an image.
Figure 11B:
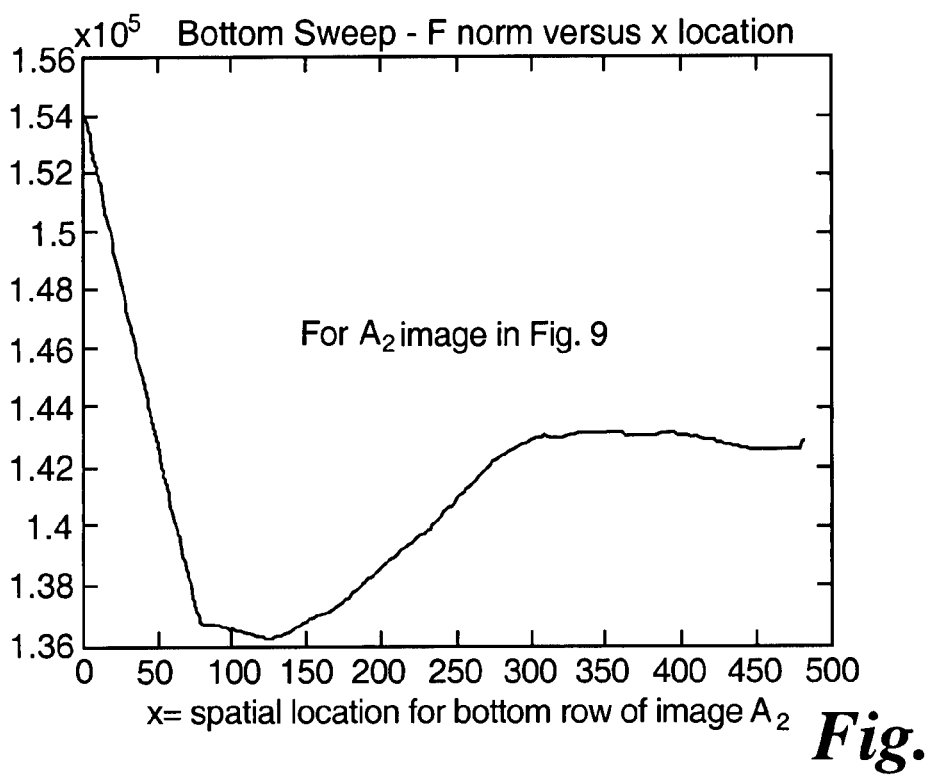
FIG. 11b shows a prior art graph of spatial location for bottom row of an image.
Figure 28:
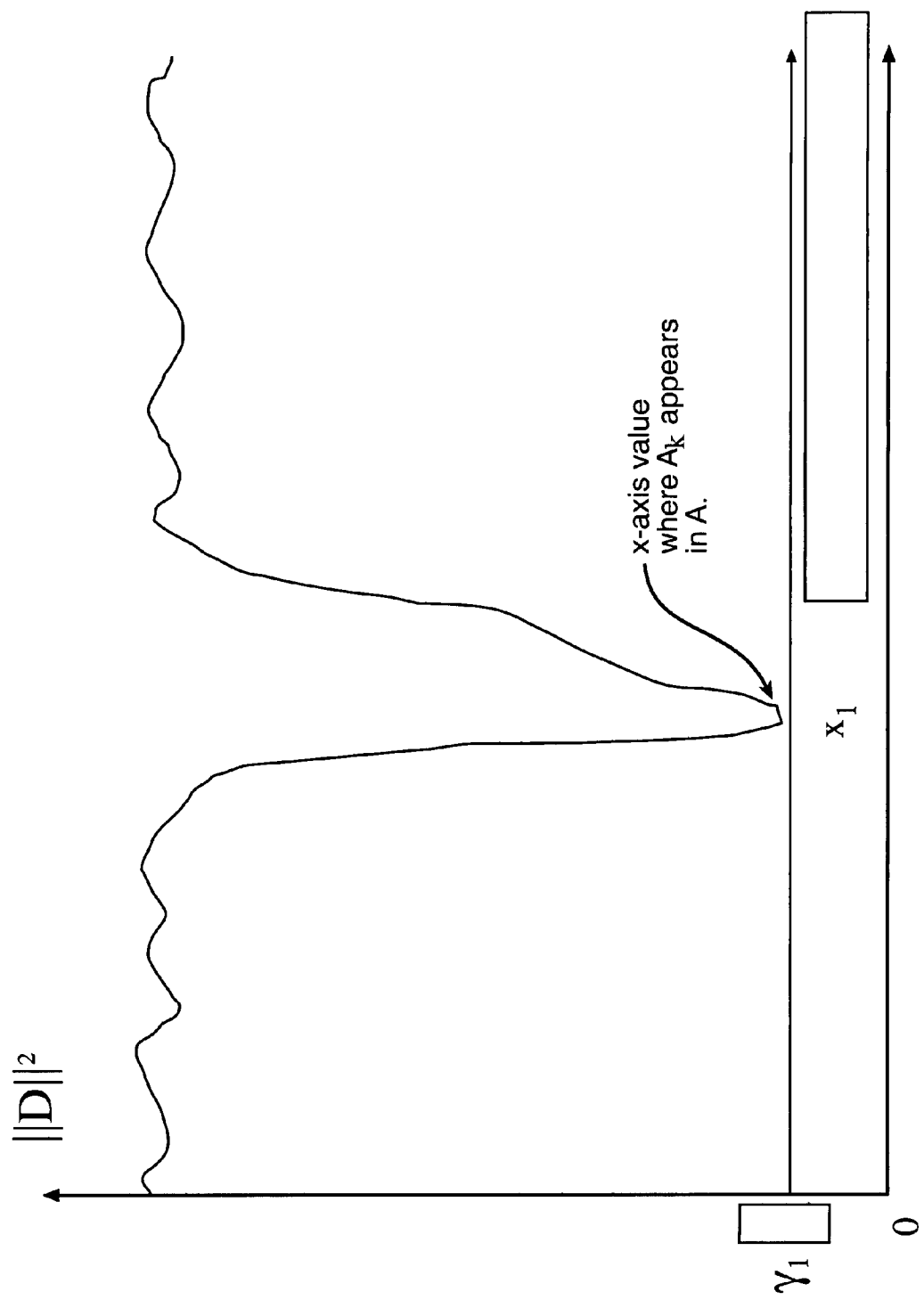
FIG. 28 shows a plot of difference matrix when noise may be in the image.
Figure 29:
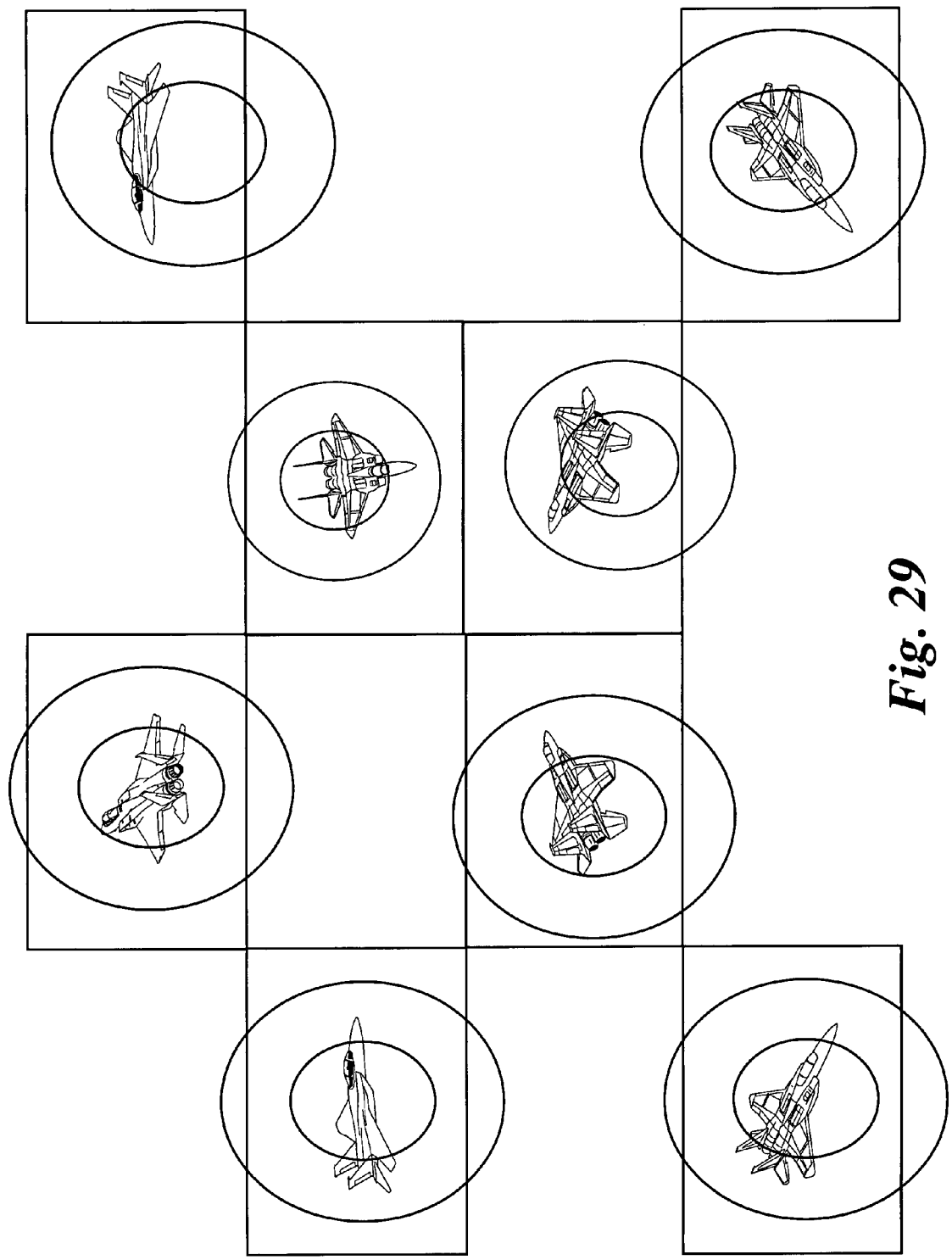
FIG. 29 shows an image with saliency added to objects found in the data image.

In a preferred arrangement of the invention the saliency of an object would be improved once the object has been identified in an image. In FIG. 28, if the identification metric $\|D_1\|$ becomes sufficiently small with a high spatial gradient (defined by some logical rules such as):

$$\text{If } \|D_1\| < \gamma_1 > 0 \quad \text{Eq 5}$$

and $$\partial/\partial x \|D_1\| > \gamma_2 > 0 \quad \text{Eq 6}$$

where the spatial derivative ($\partial/\partial x$) refers to the rate of change of $\|D_1\|$ with spatial distance in the image, this may be a fair means to improve saliency to the object at the spatial points where equations (5-6) hold. FIG. 29 shows possible saliency enhancement if the rules in Eqs. 5 and Eq. 6 hold. FIG. 29 shows a possible implementation using the test image of FIG. 9. Extensive testing must be accomplished to establish the appropriate values of the two threshold parameters $\gamma_1$ and $\gamma_2$ in equations 5 and 6.

Equation 5 and Equation 6 presently show that for noise free images, about a 50% reduction in $\|D_1\|$ will accurately detect the object and the variable $\gamma_1$ can be set to 50% of the baseline value. For the $\delta_2$ variable, the value will depend on the bit size of the image word (8 bit is for 256 brightness levels) and can also be changed, the level of noise and possible clutter in the image.

Figure 30:
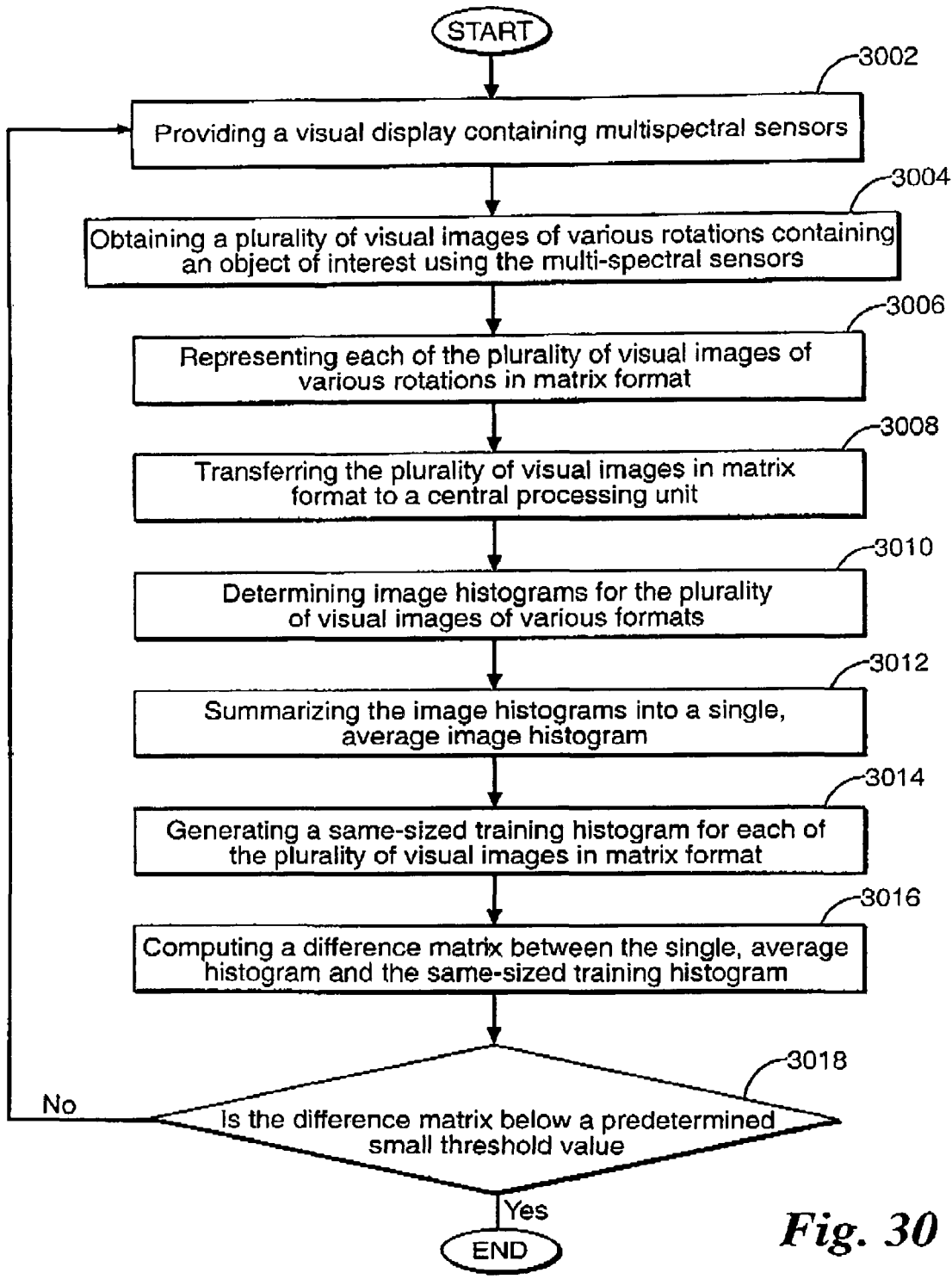
FIG. 30 shows a flowchart of the present invention for identifying an object in a compromised visual image.

As illustrated in FIG. 30, the present invention includes a method for identifying an object in a compromised visual image. The method includes a first step 3002 of providing a visual display containing multispectral sensors. The step of obtaining a plurality of visual images of various rotations containing an object of interest using the multi-spectral sensors is performed at step 3004. The step of representing each of the plurality of visual images of various rotations in matrix format is performed at step 3006. The step of transferring the plurality of visual images in matrix format to a central processing unit is performed at step 3008. The step of determining image histograms for the plurality of visual images of various formats is performed at step 3010. The step of summarizing the image histograms from the determining step into a single, average image histogram is performed at step 3012. The step of generating a same-sized training histogram for each of the plurality of visual images in matrix format is made at step 3014. The step of computing a difference matrix between the single, average histogram and the same-sized training histogram is made at step 3016. Each of the steps is repeated until the difference matrix is below a predetermined threshold value as determined at step 3018.

In summary, the method of the invention has significantly advantages and novel aspects. Frequency histograms versus brightness levels are used to build the difference matrix and an object "profile" or object "signature" is obtained in terms of the average histogram over the class of images that define an object. With these two aspects, the computational requirements are significantly reduced. The present invention uses a much smaller matrix $D_1$ rather than D which appears in the traditional methods. Additionally, the fact that the shape of the histogram plots is very similar for rotations of the object of interest is utilized, and the fact that the shape of the histogram plots is very similar for scale-range variations of the object except for a K factor, which can be adjusted, is also utilized.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

The invention claimed is:

1. A method for identifying an object in a compromised visual image comprising the steps of:
   providing a visual display containing multispectral sensors;
   obtaining a plurality of visual images of various rotations containing an object of interest using said multi-spectral sensors;
   representing each of said plurality of visual images of various rotations in matrix format;
   transferring said plurality of visual images in matrix format to a central processing unit;
   determining image histograms for said plurality of visual images of various formats;
   summarizing said image histograms from said determining step into a single, average image histogram;
   generating a same-sized training histogram for each of said plurality of visual images in matrix format; and
   computing a difference matrix between said single, average histogram and said same-sized training histogram;
   wherein said steps are repeated until said difference matrix is below a predetermined small threshold value.

2. The method of claim 1 wherein said providing step further comprises providing a visual display including image adjustment means for scale-range variations.

3. The method of claim 2 further including, after said transferring step, second transferring a signal from said image adjustment means to said central processing unit.

4. The method of claim 2 wherein said summarizing step further includes summarizing said image histograms from said determining step into a single, average image histogram scaled down by an image adjustment factor K as image size changes.

5. The method of claim 1 wherein said providing step further comprises providing a helmet mounted display.

6. The method of claim 1 wherein said providing step further comprises providing an eye-glass system.

7. The method of claim 1 wherein said transferring step further comprises transferring said visual image to a central processing unit including a microprocessor element.

8. The method of claim 1 wherein said summarizing step further comprises summarizing said image histograms from said determining step into a single, average image histogram based on each of said single histograms being a similar shape.

9. The method of claim 1 wherein said obtaining step further comprises obtaining a plurality of visual images of eight rotations containing an object of interest using said multi-spectral sensors.

10. The method of claim 1 wherein said obtaining step further comprises obtaining a plurality of visual images of four rotations containing an object of interest using said multi-spectral sensors.

11. The method of claim 1 wherein said determining step further comprises determining image histograms $f_1(x), \ldots, f_8(x)$.

12. The method of claim 11 wherein said generating step further comprises generating a same-sized training histogram $f_m(x)$.

13. The method of claim 12 wherein said computing step further comprises computing a difference matrix $D_1(x)=[f_m(x)-f_1(x), f_m(x)-f_2(x), \ldots, f_m(x)-f_8(x)]$.

14. A method for identifying an object in a compromised visual image comprising the steps of:
   providing a visual display containing multispectral sensors and image adjustment means;
   obtaining a plurality of visual images of eight rotations containing an object of interest using said multi-spectral sensors;
   representing each of said plurality of visual images of eight rotations in matrix format;
   transferring said plurality of visual images in matrix format to a central processing unit including a microprocessor;
   second transferring a signal from said image adjustment means to said central processing unit;
   determining image histograms for said plurality of visual images of various formats;
   summarizing said image histograms from said determining step into a single, average image histogram;
   generating a same-sized training histogram for each of said plurality of visual images in matrix format; and
   computing a difference matrix between said single, average histogram and said same-sized training histogram;
   wherein said steps are repeated until said difference matrix is below a predetermined small threshold value.

15. A method for identifying an object in a compromised visual image comprising the steps of:
   providing a visual display containing multispectral sensors;
   obtaining a plurality of visual images of various rotations containing an object of interest using said multi-spectral sensors;
   representing each of said plurality of visual images of various rotations in matrix format;
   transferring said plurality of visual images in matrix format to a central processing unit;
   determining image histograms for said plurality of visual images of various formats;

scaling said image histograms to achieve a desired histogram size;

summarizing said image histograms from said determining step into a single, average image histogram;

generating a same-sized training histogram for each of said plurality of visual images in matrix format; and computing a difference matrix between said single, average histogram and said same-sized training histogram;

wherein said steps are repeated until said difference matrix is below a predetermined small threshold value.

16. The method of claim 15 wherein said providing step further comprises providing a visual display including image adjustment means for scale-range variations.

17. The method of claim 16 further including, after said transferring step, second transferring a signal from said image enhancement means to said central processing unit.

18. The method of claim 15 wherein said determining step further comprises determining image histograms $f_1(x), \ldots, f_8(x)$.

19. The method of claim 18 herein said generating step further comprises generating a same-sized training histogram $f_m(x)$.

20. The method of claim 19 wherein said computing step further comprises computing a difference matrix $D_1(x)=[f_m(x)-f_1(x), f_m(x)-f_2(x), \ldots, f_m(x)-f_8(x)]$.

* * * * *